US009433256B2

(12) United States Patent
Callahan et al.

(10) Patent No.: US 9,433,256 B2
(45) Date of Patent: Sep. 6, 2016

(54) ARTICLE OF FOOTWEAR AND METHODS OF MAKING SAME

(75) Inventors: Erica Callahan, Medford, MA (US); Matthew Montross, Middleboro, MA (US); Henry Hardigan, Pawtucket, RI (US); Ricardo Vestuti, Providence, RI (US)

(73) Assignee: Reebok International Limited, London (GB)

( * ) Notice: Subject to any disclaimer, the term of this patent is extended or adjusted under 35 U.S.C. 154(b) by 0 days.

(21) Appl. No.: 12/832,464

(22) Filed: Jul. 8, 2010

(65) Prior Publication Data

US 2011/0016749 A1    Jan. 27, 2011

Related U.S. Application Data

(63) Continuation-in-part of application No. 12/506,957, filed on Jul. 21, 2009.

(51) Int. Cl.
*A43B 1/10* (2006.01)
*A43B 5/00* (2006.01)
(Continued)

(52) U.S. Cl.
CPC ........... *A43B 13/187* (2013.01); *A43B 3/0057* (2013.01); *A43B 3/0068* (2013.01); *A43B 13/14* (2013.01); *A43B 13/141* (2013.01); *A43B 13/181* (2013.01); *B29D 35/122* (2013.01)

(58) Field of Classification Search
CPC ...... A43B 13/00; A43B 13/14; A43B 13/12; A43B 13/18; A43B 13/183; A43B 13/141; A43B 13/206; A43B 13/181; A43B 13/184; A43B 13/187; A43B 13/145; A43B 13/146; A43B 13/186; A43B 13/223; A43B 3/0057; A43B 3/0063; A43B 3/0068
USPC ..... 36/102, 103, 59 R, 35 B, 27, 28, 29, 31, 36/25 R, 35 R
See application file for complete search history.

(56) References Cited

U.S. PATENT DOCUMENTS 485,459 A    11/1892   Crocker
1,594,056 A   7/1926   Floyd
(Continued)

FOREIGN PATENT DOCUMENTS

DE         1145961           3/1963
DE         2816619 A1 *     10/1979  ............. A43B 13/20
(Continued)

OTHER PUBLICATIONS

K-Swiss, Inc. Online Store—Tubes Run 100A, http://www.kswiss.com/item/201.200/02316-162/Men/Footwear_Running/Tubes_Run_100_A/Wht_Blk_Sunorng.html (visited on Oct. 2, 2009), 2 pages.

(Continued)

*Primary Examiner* — Alissa L Hoey
*Assistant Examiner* — Jameson Collier
(74) *Attorney, Agent, or Firm* — Sterne, Kessler, Goldstein & Fox P.L.L.C.

(57) ABSTRACT

An article of footwear with an undulating sole provides a different and unique ride and/or feel to the article of footwear while also providing adequate cushioning and support to an article of footwear. The sole has an undulating shape that may be substantially similar to a sine wave with a series of alternating peaks and troughs.

31 Claims, 29 Drawing Sheets

(51) Int. Cl.
  *A43B 13/00* (2006.01)
  *A43B 13/14* (2006.01)
  *A43B 13/18* (2006.01)
  *A43B 3/00* (2006.01)
  *B29D 35/12* (2010.01)

(56) References Cited

U.S. PATENT DOCUMENTS

| | | |
|---|---|---|
| 1,607,375 A | 11/1926 | Whipple |
| D108,320 S | 2/1938 | Eldon |
| D133,176 S | 7/1942 | Gregg |
| D136,381 S | 9/1943 | Ghez et al. |
| D149,139 S | 3/1948 | Parker |
| D157,034 S | 1/1950 | Eldon |
| 2,553,616 A * | 5/1951 | Walls ............... A43B 13/20 36/29 |
| 2,580,840 A | 1/1952 | Rogndal |
| 2,627,676 A | 2/1953 | Hack |
| D173,030 S | 9/1954 | Hoza |
| 2,710,461 A * | 6/1955 | Hack .................... 36/28 |
| 2,722,756 A | 11/1955 | Ecclesine |
| 3,005,272 A * | 10/1961 | Shelare et al. ............ 36/29 |
| 3,087,262 A * | 4/1963 | Russell ............ A43B 13/181 36/28 |
| 3,444,632 A | 5/1969 | Hack et al. |
| 3,717,943 A * | 2/1973 | Orndorff, Jr. ........ A43B 13/14 36/32 R |
| D233,805 S | 12/1974 | Kubo |
| 4,071,963 A * | 2/1978 | Fukuoka ................ 36/3 B |
| 4,130,947 A | 12/1978 | Oenu |
| 4,170,078 A * | 10/1979 | Moss .................... 36/28 |
| D274,574 S | 7/1984 | Stubblefield |
| 4,507,879 A * | 4/1985 | Dassler ............... A43B 5/02 36/102 |
| 4,536,974 A * | 8/1985 | Cohen .................. 36/28 |
| 4,561,195 A | 12/1985 | Onoda et al. |
| 4,611,412 A * | 9/1986 | Cohen .................. 36/28 |
| 4,642,917 A | 2/1987 | Ungar |
| D296,149 S | 6/1988 | Diaz |
| 4,798,010 A | 1/1989 | Sugiyama |
| 4,805,319 A | 2/1989 | Tonkel |
| 4,864,737 A | 9/1989 | Marrello |
| D316,324 S | 4/1991 | Rogers |
| 5,044,096 A | 9/1991 | Polegato |
| D324,131 S | 2/1992 | Lucas |
| D325,288 S | 4/1992 | Richard et al. |
| D326,014 S | 5/1992 | Issler |
| D327,362 S | 6/1992 | Hatfield |
| D334,282 S | 3/1993 | Greene |
| D336,771 S | 6/1993 | Hatfield et al. |
| D347,516 S | 6/1994 | Foster |
| 5,319,866 A | 6/1994 | Foley et al. |
| 5,337,492 A | 8/1994 | Anderie et al. |
| D356,206 S | 3/1995 | Martin |
| D357,346 S | 4/1995 | Ho |
| D360,065 S | 7/1995 | Werman |
| 5,461,800 A | 10/1995 | Luthi et al. |
| D364,497 S | 11/1995 | Schelling |
| 5,469,639 A | 11/1995 | Sessa |
| D367,952 S | 3/1996 | Shea |
| D378,011 S | 2/1997 | Lucas |
| D379,259 S | 5/1997 | Kayano |
| D385,987 S | 11/1997 | Bramani |
| D390,346 S | 2/1998 | Loveder |
| 5,713,140 A | 2/1998 | Baggenstoss |
| D394,945 S | 6/1998 | Doxey |
| D395,739 S | 7/1998 | Mervar |
| D396,947 S | 8/1998 | Serna |
| D397,847 S | 9/1998 | Hudson |
| 5,799,415 A | 9/1998 | Kenji et al. |
| 5,822,886 A * | 10/1998 | Luthi et al. ............ 36/28 |
| D402,455 S | 12/1998 | Greenberg |
| D412,236 S | 7/1999 | von Contal |
| 5,918,385 A * | 7/1999 | Sessa .................. 36/59 C |
| D414,316 S | 9/1999 | Lozano |
| D415,610 S | 10/1999 | Cahill |
| 5,987,782 A | 11/1999 | Bramani |
| 6,009,637 A | 1/2000 | Pavone |
| D420,497 S | 2/2000 | Panella |
| D421,834 S | 3/2000 | Cooper |
| D424,287 S | 5/2000 | Edwards |
| 6,079,125 A | 6/2000 | Quellais et al. |
| 6,108,943 A | 8/2000 | Hudson et al. |
| 6,138,385 A | 10/2000 | Jungkind et al. |
| 6,189,239 B1 | 2/2001 | Gasparovic et al. |
| 6,205,681 B1 | 3/2001 | Kita |
| 6,219,939 B1 | 4/2001 | Kita et al. |
| 6,219,940 B1 | 4/2001 | Kita |
| D442,357 S | 5/2001 | Burt |
| 6,226,896 B1 | 5/2001 | Friton |
| 6,289,608 B1 | 9/2001 | Kita et al. |
| D449,433 S | 10/2001 | Matis et al. |
| 6,295,741 B1 | 10/2001 | Kita |
| 6,305,100 B1 | 10/2001 | Komarnycky et al. |
| 6,311,414 B1 | 11/2001 | Kita |
| 6,314,664 B1 | 11/2001 | Kita et al. |
| 6,338,206 B1 | 1/2002 | Kita |
| 6,389,713 B1 | 5/2002 | Kita |
| 6,393,732 B1 | 5/2002 | Kita |
| 6,401,365 B2 | 6/2002 | Kita et al. |
| D465,079 S | 11/2002 | Merceron |
| 6,516,539 B2 | 2/2003 | Nishiwaki et al. |
| 6,557,270 B2 | 5/2003 | Nakano et al. |
| D475,509 S | 6/2003 | Avar |
| 6,606,804 B2 | 8/2003 | Kaneko et al. |
| 6,625,905 B2 | 9/2003 | Kita |
| 6,647,645 B2 | 11/2003 | Kita |
| 6,675,500 B1 | 1/2004 | Cadamuro |
| 6,685,011 B2 | 2/2004 | Nishiwaki et al. |
| 6,694,642 B2 | 2/2004 | Turner |
| 6,711,834 B1 | 3/2004 | Kita |
| D489,525 S | 5/2004 | Snow et al. |
| D489,881 S | 5/2004 | Recchi |
| D490,599 S | 6/2004 | Snow et al. |
| 6,754,981 B1 | 6/2004 | Edwards |
| 6,763,611 B1 | 7/2004 | Fusco |
| D495,128 S | 8/2004 | Avar |
| D497,046 S | 10/2004 | Scott |
| 6,810,605 B2 | 11/2004 | Nakano et al. |
| D499,247 S | 12/2004 | Wahoske et al. |
| 6,964,119 B2 | 11/2005 | Weaver, III |
| D515,305 S | 2/2006 | Andrews-Kramer |
| D515,306 S | 2/2006 | Andrews-Kramer |
| D516,293 S | 3/2006 | Smith, III |
| D523,232 S | 6/2006 | Shaffer |
| D523,614 S | 6/2006 | Mitchell |
| D523,627 S | 6/2006 | Avar |
| D523,628 S | 6/2006 | Young |
| 7,055,198 B2 | 6/2006 | Cadamuro et al. |
| D524,034 S | 7/2006 | Hlavacs |
| D524,035 S | 7/2006 | Greene et al. |
| D524,535 S | 7/2006 | Cass |
| 7,089,152 B2 | 8/2006 | Oda et al. |
| D528,753 S | 9/2006 | Dirsa |
| D528,776 S | 9/2006 | Hui |
| D528,778 S | 9/2006 | Avar et al. |
| D529,267 S | 10/2006 | Portzline |
| D530,905 S | 10/2006 | Jonsson |
| D532,597 S | 11/2006 | Chan |
| 7,162,815 B2 | 1/2007 | Miyauchi et al. |
| D537,611 S | 3/2007 | Matis et al. |
| D546,532 S | 7/2007 | Matis et al. |
| D552,832 S | 10/2007 | Hardy |
| D553,837 S | 10/2007 | Hubbard |
| D553,846 S | 10/2007 | Kayano et al. |
| D555,348 S | 11/2007 | Bettencourt |
| D555,891 S | 11/2007 | Bettencourt |
| D560,061 S | 1/2008 | Chan |
| D560,062 S | 1/2008 | Chan |
| D560,063 S | 1/2008 | Chan |
| D561,958 S | 2/2008 | Hahn |
| D561,985 S | 2/2008 | Andersen et al. |
| 7,334,349 B2 * | 2/2008 | Sokolowski et al. ......... 36/25 R |
| 7,337,559 B2 | 3/2008 | Russell |

(56) References Cited

U.S. PATENT DOCUMENTS

| | | |
|---|---|---|
| D569,594 S | 5/2008 | Horne et al. |
| D569,595 S | 5/2008 | Le |
| D570,078 S | 6/2008 | Davis |
| D574,141 S | 8/2008 | Kaufman |
| D574,581 S | 8/2008 | Cooper |
| D574,583 S | 8/2008 | St-Louis et al. |
| D574,602 S | 8/2008 | Grenet |
| D574,603 S | 8/2008 | McMillan |
| D574,604 S | 8/2008 | McMillan |
| D576,394 S | 9/2008 | Heller |
| D578,744 S | 10/2008 | Earle |
| 7,441,346 B2 | 10/2008 | Hardy et al. |
| D584,490 S | 1/2009 | Ong |
| D586,991 S | 2/2009 | Fuerst |
| D586,993 S | 2/2009 | Banik et al. |
| D592,383 S | 5/2009 | Wawrousek |
| D592,847 S | 5/2009 | Rosenbaum |
| D594,195 S | 6/2009 | Nakano |
| 7,549,236 B2 | 6/2009 | Dillon et al. |
| D595,937 S | 7/2009 | Morris |
| D596,386 S | 7/2009 | Brambilla |
| 7,556,846 B2 | 7/2009 | Dojan et al. |
| D599,986 S | 9/2009 | Reiss |
| D600,895 S | 9/2009 | Morgan |
| D601,334 S | 10/2009 | Werman |
| D605,838 S | 12/2009 | Foust |
| D607,193 S | 1/2010 | Recchi |
| D607,633 S | 1/2010 | Mongelli |
| 7,644,518 B2 | 1/2010 | Chandler et al. |
| D609,440 S | 2/2010 | Morris |
| D609,441 S | 2/2010 | Wawrousek |
| D615,286 S | 5/2010 | Grote |
| D615,741 S | 5/2010 | Matis et al. |
| D616,188 S | 5/2010 | Chan |
| 7,707,743 B2 | 5/2010 | Schindler |
| D617,085 S | 6/2010 | Recchi et al. |
| D617,983 S | 6/2010 | Raysse |
| 7,762,008 B1 | 7/2010 | Clark et al. |
| D622,043 S | 8/2010 | Hauglin |
| 7,784,196 B1 | 8/2010 | Christensen et al. |
| D624,293 S | 9/2010 | Recchi et al. |
| D634,922 S | 3/2011 | Pauk et al. |
| D636,567 S | 4/2011 | Raysse |
| D637,380 S | 5/2011 | Niedner et al. |
| 7,946,058 B2 | 5/2011 | Johnson et al. |
| D641,143 S | 7/2011 | Niedner et al. |
| D641,545 S | 7/2011 | Niedner et al. |
| D642,776 S | 8/2011 | Raysse |
| D643,194 S | 8/2011 | Raysse |
| D644,419 S | 9/2011 | Raysse |
| D644,420 S | 9/2011 | Christopherson |
| D644,824 S | 9/2011 | Leleu |
| D646,871 S | 10/2011 | Christopherson |
| 8,056,264 B2 | 11/2011 | Sato et al. |
| D649,753 S | 12/2011 | Callahan et al. |
| D649,754 S | 12/2011 | Callahan et al. |
| D652,201 S | 1/2012 | Vestuti et al. |
| D653,842 S | 2/2012 | Weiss |
| 8,112,905 B2 * | 2/2012 | Bemis et al. ............ 36/27 |
| D655,483 S | 3/2012 | Portzline |
| D655,487 S | 3/2012 | Blakeslee |
| D655,489 S | 3/2012 | Mahoney |
| D655,897 S | 3/2012 | Mahoney |
| D655,902 S | 3/2012 | Debiase |
| D656,715 S | 4/2012 | Katz et al. |
| D656,720 S | 4/2012 | Wawrousek |
| D657,542 S | 4/2012 | Duan |
| D657,944 S | 4/2012 | Casadei |
| 8,146,266 B2 | 4/2012 | Vattes et al. |
| D659,356 S | 5/2012 | Van Zyll De Jong et al. |
| D659,362 S | 5/2012 | Van Zyll De Jong et al. |
| D659,958 S | 5/2012 | Birkinhead |
| D659,959 S | 5/2012 | Vestuti et al. |
| D659,964 S | 5/2012 | Callahan et al. |
| D659,965 S | 5/2012 | Callahan et al. |
| D660,568 S | 5/2012 | Blakeslee |
| 8,181,365 B2 | 5/2012 | Cass et al. |
| D661,476 S | 6/2012 | Loverin |
| D661,879 S | 6/2012 | Raysse |
| D661,880 S | 6/2012 | Raysse |
| D662,293 S | 6/2012 | Christopherson |
| D662,295 S | 6/2012 | Raysse |
| D662,301 S | 6/2012 | Raysse |
| D662,697 S | 7/2012 | Portzline |
| D662,699 S | 7/2012 | Callahan et al. |
| D662,700 S | 7/2012 | Raysse |
| D663,929 S | 7/2012 | Teng-Lee |
| D666,390 S | 9/2012 | Van Zyll De Jong et al. |
| D667,204 S | 9/2012 | Campbell et al. |
| D667,617 S | 9/2012 | Spring |
| D667,618 S | 9/2012 | Raysse |
| D667,619 S | 9/2012 | Blakeslee |
| D668,028 S | 10/2012 | Pope |
| D668,029 S | 10/2012 | Vestuti et al. |
| D669,255 S | 10/2012 | Birkenhead |
| D674,581 S | 1/2013 | Callahan et al. |
| D674,996 S | 1/2013 | Sallee |
| D674,997 S | 1/2013 | Callahan et al. |
| D675,003 S | 1/2013 | Leon et al. |
| 2001/0008053 A1 | 7/2001 | Belli |
| 2003/0101621 A1 | 6/2003 | Nishiwaki et al. |
| 2004/154189 A1 | 8/2004 | Wang |
| 2006/0137227 A1 | 6/2006 | Kita et al. |
| 2006/0277792 A1 | 12/2006 | Schoenborn |
| 2006/0283045 A1 | 12/2006 | Kita et al. |
| 2007/0033837 A1 | 2/2007 | Fulton |
| 2007/0209230 A1 | 9/2007 | Dillon et al. |
| 2007/0266593 A1 * | 11/2007 | Schindler et al. .......... 36/28 |
| 2008/0052965 A1 | 3/2008 | Sato |
| 2008/0066347 A1 | 3/2008 | Suzuki |
| 2008/0120871 A1 * | 5/2008 | Sato et al. .......... 36/88 |
| 2008/0229617 A1 | 9/2008 | Johnson et al. |
| 2008/0276491 A1 * | 11/2008 | Gaensler et al. .......... 36/28 |
| 2008/0289224 A1 * | 11/2008 | Sink .......... 36/28 |
| 2009/0013559 A1 | 1/2009 | Chan et al. |
| 2010/0175280 A1 | 7/2010 | Rinehart, Jr. et al. |
| 2010/0192420 A1 | 8/2010 | Favraud |
| 2010/0269376 A1 | 10/2010 | Flannery et al. |
| 2010/0325917 A1 | 12/2010 | Cass et al. |
| 2011/0016746 A1 | 1/2011 | Callahan et al. |
| 2011/0016749 A1 | 1/2011 | Callahan et al. |
| 2011/0232130 A1 | 9/2011 | Boudreau et al. |
| 2011/0277351 A1 | 11/2011 | Scoledes |
| 2011/0289799 A1 | 12/2011 | Keating et al. |
| 2012/0000095 A1 | 1/2012 | Torrance |
| 2012/0055047 A1 | 3/2012 | Youngs |
| 2012/0073160 A1 | 3/2012 | Marvin et al. |

FOREIGN PATENT DOCUMENTS

| | | | |
|---|---|---|---|
| EP | 1064861 A1 | 1/2001 | |
| JP | 05309001 A * | 11/1993 | |
| JP | 11000203 | 1/1999 | |
| JP | 11235202 | 8/1999 | |
| JP | 2001275711 | 10/2001 | |
| JP | 2002336003 | 11/2002 | |
| JP | 2003339405 | 12/2003 | |
| JP | 2004173884 | 6/2004 | |
| JP | 2004267516 | 9/2004 | |
| JP | 2005253578 | 9/2005 | |
| WO | WO 8101234 A1 * | 5/1981 | ............ A43B 13/18 |
| WO | WO 2004028285 | 4/2004 | |

OTHER PUBLICATIONS

Adidas Q2 2007 Footwear Catalog, p. 5, showing the T 7 ATS shoe, and p. 122, showing the J S3 W shoe.

U.S. Appl. No. 12/506,957, Erica Callahan, "Article of Footwear Having an Undulating Sole", filed Jul. 21, 2009.

U.S. Appl. No. 12/748,246, Matthew Boudreau, "Article of Footwear with Support Element", filed Mar. 26, 2010.

U.S. Appl. No. 29/342,098, Erica Callahan, "Shoe Sole and Portion of a Shoe Sole", filed Aug. 8, 2009.

(56) References Cited

OTHER PUBLICATIONS

U.S. Appl. No. 29/345,964, Christopher S. Pope, "Shoe Sole and Portion of a Shoe", filed Oct. 23, 2009.
U.S. Appl. No. 29/353,673, Erica Callahan, "Portion of a Shoe Sole", filed Jan. 12, 2010.
U.S. Appl. No. 29/362,605, Ricardo Vestuti, "Shoe and Portion of a Shoe", filed May 27, 2010.
U.S. Appl. No. 29/375,659, Toby Birkinhead, "Portion of a Shoe", filed Sep. 24, 2010.
Office Action dated Aug. 12, 2011 from U.S. Appl. No. 29/362,605, Vestuti et al., Shoe and Portion of Shoe, filed May 27, 20010.
Office Action dated Sep. 13, 2011 from U.S. Appl. No. 29/345,964, Pope, Portion of a Shoe, filed Oct. 23, 2009.
U.S. Appl. No. 12/980,961, Brian Christensen, "Sole and Article of Footware", filed Dec. 29, 2010.
U.S. Appl. No. 29/405,483, Erica Callahan, "Portion of a Shoe", filed Nov. 2, 2011.
U.S. Appl. No. 29/405,484, Erica Callahan, "Portion of a Shoe", filed Nov. 2, 2011.
U.S. Appl. No. 29/408,163, Ricardo Vestuti, "Shoe and Portion of a Shoe", filed Dec. 7, 2011.
Extended European Search Report for Application No. EP 11194626.5, Applicant: Reebok International Limited, mailed May 8, 2012, 6 pages.
U.S. Appl. No. 29/411,762, Hardigan et al., "Portion of a Shoe Sole", filed Jan. 25, 2012.
U.S. Appl. No. 29/416,617, Davis et al., "Portion of a Shoe ", filed Mar. 23, 2012.
U.S. Appl. No. 13/428,897, Davis et al., "Articles of Footwear ", filed Mar. 23, 2012.
U.S. Appl. No. 29/418,772, Vestuti et al., "Portion of a Shoe", filed Apr. 20, 2012.
U.S. Appl. No. 29/419,638, Birkinhead, "Portion of a Shoe", filed Apr. 30, 2012.
U.S. Appl. No. 29/419,900, Callahan et al., "Portion of a Shoe", filed May 2, 2012.
U.S. Appl. No. 29/419,905, Callahan et al., "Portion of a Shoe", filed May 2, 2012.
Office Action dated Apr. 25, 2012 from U.S. Appl. No. 12/506,957, Callahan et al., Article of Footwear Having an Undulating Sole, filed Jul. 21, 2009.
U.S. Appl. No. 29/443,834, Callahan, "Shoe Sole", filed Jan. 16, 2013.
Office Action dated May 30, 2013 from U.S. Appl. No. 12/506,957, Callahan et al., Article of Footware Having an Undulating Sole, filed Jul. 21, 2009.
Office Action dated May 17, 2013 from U.S. Appl. No. 12/748,246, Boudreau et al., Article of Footware with Support Element, filed Mar. 26, 2010.
Partial European Search Report for Appl. No. EP 10170301.5, European Patent Office, Munich, Germany, mailing date of Feb. 6, 2015, 13 pages.
Partial European Search Report for Application No. EP 10170301.5, European Patent Office, Munich, Germany, dated Sep. 29, 2014, 7 pages.

\* cited by examiner

ARTICLE OF FOOTWEAR AND METHODS OF MAKING SAME

CROSS-REFERENCE TO RELATED APPLICATIONS

This application is a continuation-in-part of U.S. application Ser. No. 12/506,957, filed Jul. 21, 2009 and entitled Article of Footwear Having an Undulating Sole, the entire disclosure of which is hereby incorporated herein by reference thereto.

BACKGROUND OF THE INVENTION

1. Field of the Invention

The present invention is directed to an article of footwear having an undulating sole.

2. Background Art

Individuals are often concerned with the amount of cushioning an article of footwear provides, as well as the aesthetic appeal of the article, of footwear. This is true for articles of footwear worn for non-performance activities, such as a leisurely stroll, and for performance activities, such as running, because throughout the course of an average day, the feet and legs of an individual are subjected to substantial impact forces. Running, jumping, walking, and even standing exert forces upon the feet and legs of an individual which can lead to soreness, fatigue, and injury.

The human foot is a complex and remarkable piece of machinery, capable of withstanding and dissipating many impact forces. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during every day activity. Unless an individual is wearing shoes which provide proper cushioning and support, the soreness and fatigue associated with every day activity is more acute, and its onset accelerated. The discomfort for the wearer that results may diminish the incentive for further activity. Equally important, inadequately cushioned footwear can lead to injuries such as blisters; muscle, tendon and ligament damage; and bone stress fractures. Improper footwear can also lead to other ailments, including back pain.

Proper footwear should complement the natural functionality of the foot, in part, by incorporating a sole (typically including an outsole, midsole and insole) which absorbs shocks. Therefore, a continuing need exists for innovations in providing cushioning to articles of footwear.

BRIEF SUMMARY OF THE INVENTION

In one embodiment, an article of footwear includes an undulating foam sole. The undulating foam sole includes a plurality of spaced apart peaks, wherein at least one pair of adjacent peaks define a gap void of material between adjacent peaks, and a plurality of spaced apart troughs, wherein at least one trough is adapted to engage the ground and wherein at least one pair of adjacent troughs define a gap void of material between adjacent troughs.

In another embodiment, an article of footwear includes an undulating foam midsole. The undulating midsole includes a first side, a second side, a plurality of spaced apart peaks extending along a width of the midsole between the first and second sides, and a plurality of spaced apart troughs extending along a width of the midsole between the first and second sides. At least one pair of adjacent peaks define a gap void of material between the adjacent peaks that extends along the width of the midsole with one end at the first side and another end at the second side. At least one pair of adjacent troughs define a gap void of material between the adjacent troughs that extends along the width of the midsole with one end at the first side and another end at the second side.

In a further embodiment, an article of footwear includes an undulating midsole and a plate. The undulating midsole includes a first side, a second side, a plurality of spaced apart peaks extending along a width of the midsole between the first and second sides, and a plurality of spaced apart troughs extending along a width of the midsole between the first and second sides. The plate is attached to the plurality of spaced apart peaks. Each of the plurality of spaced apart peaks has a greater height at the first and second sides of the midsole than in an area between the first and second sides.

In a further embodiment, an article of footwear includes an upper; a plate connected to the upper; and an undulating sole having a top surface connected to the plate and a bottom surface, the sole comprising a plurality of spaced apart peaks defining a plurality of gaps in the top surface and a plurality of spaced apart troughs defining a plurality of gaps in the bottom surface. The article of footwear may further comprise one or more support elements coupled to the sole for providing support thereto. The support element may be disposed between the sole and the plate. In one embodiment, the support element may be disposed in a gap in the top surface of the sole.

In a further embodiment, a sole for an article of footwear includes a midsole having a heel portion, a forefoot portion, a medial sidewall and a lateral sidewall, and wherein the midsole is substantially sinusoidal along at least a portion of the length of the midsole, and wherein the midsole extends along a width of the midsole. It will be appreciated by those of ordinary skill in the art that the terms sinusoidal and sine wave as used herein refer to the undulating shape of the midsole and are not meant to be used in a strict mathematical sense. In one embodiment, the midsole may extend across the entire width of the midsole between the medial sidewall and the lateral sidewall and may have a top surface shaped to receive an upper of an article of footwear. The midsole may be substantially sinusoidal along a portion of, or substantially the entire length of, the midsole. In one embodiment, the lateral sidewall and/or the medial sidewall may be substantially sinusoidal. In another embodiment, the midsole may be substantially sinusoidal across the entire width of the midsole. The lateral and/or medial sidewalls may include a plurality of peaks having rounded top surfaces, flat top surfaces, pointed top surfaces, or combinations thereof. The midsole may comprise foam, and an outsole may be coupled to the midsole.

In yet a further embodiment, a sole for an article of footwear includes a midsole having a top surface, a bottom surface, a medial sidewall, and a lateral sidewall, wherein the midsole undulates to define a plurality of spaced apart gaps in the top surface and a plurality of spaced apart gaps in the bottom surface. Each of a plurality of top surface gaps may be disposed between adjacent bottom surface gaps. In one embodiment, the top surface gaps and/or the bottom surface gaps may be substantially evenly spaced apart. In one embodiment, one or more gaps extend across the entire width of the midsole. In one embodiment, the lateral and/or medial sidewalls include a plurality of peaks and each peak is disposed between adjacent top surface gaps. The lateral and/or medial sidewalls may include a plurality of peaks having rounded top surfaces, flat top surfaces, pointed top surfaces, or combinations thereof. In one embodiment, the midsole extends across the entire width of the sole between the medial sidewall and the lateral sidewall. In one embodiment, the portion of the midsole between the medial sidewall and the lateral sidewall does not undulate. In one embodiment, one or more gaps extend across the entire width of the midsole and/or only a portion of the width of the midsole.

In another embodiment, an article of footwear includes an upper; and a foam sole disposed below the upper such that a gap is disposed between the sole and the upper, the sole having a heel portion, a forefoot portion, a medial sidewall and a lateral sidewall, and wherein the sole is substantially sinusoidal along the length of the sole, and wherein the sole extends along a width of the sole. In one embodiment, a plurality of gaps may be disposed between the sole and the upper. The lateral and/or medial sidewall may include a plurality of peaks having rounded top surfaces, flat top surfaces, or pointed top surfaces. In one embodiment the article of footwear may further include a plate disposed intermediate to the upper and the sole. At least a portion of a gap may be disposed intermediate to the sole and the plate.

In another embodiment, a method of manufacturing a sole for an article of footwear includes the steps of molding an undulating foam midsole in a mold; removing the foam midsole from the mold; placing the foam midsole on a form having a plurality of spaced apart ridges; and cooling the foam midsole. The mold may comprise a plurality of spaced apart ridges and at least one injection site disposed between two adjacent ridges. In one embodiment, the mold may include between one and twenty injection sites. In one embodiment, the mold may include eleven injection sites.

In another embodiment, an article of footwear includes an undulating foam sole, which includes: a plurality of spaced apart peaks, wherein at least one pair of adjacent peaks define a first gap substantially devoid of material between adjacent peaks, and a plurality of spaced apart troughs, wherein at least one pair of adjacent troughs define a second gap substantially devoid of material between adjacent troughs; and a support element coupled to the sole for providing support thereto.

In a further embodiment, an article of footwear includes an upper; a plate connected to the upper; an undulating sole having a top side connected to the plate and a bottom side, the sole comprising a plurality of spaced apart peaks defining a plurality of gaps in the top side and a plurality of spaced apart troughs defining a plurality of gaps in the bottom side; and a support element disposed in between the sole and the plate for providing support to the sole.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 6:
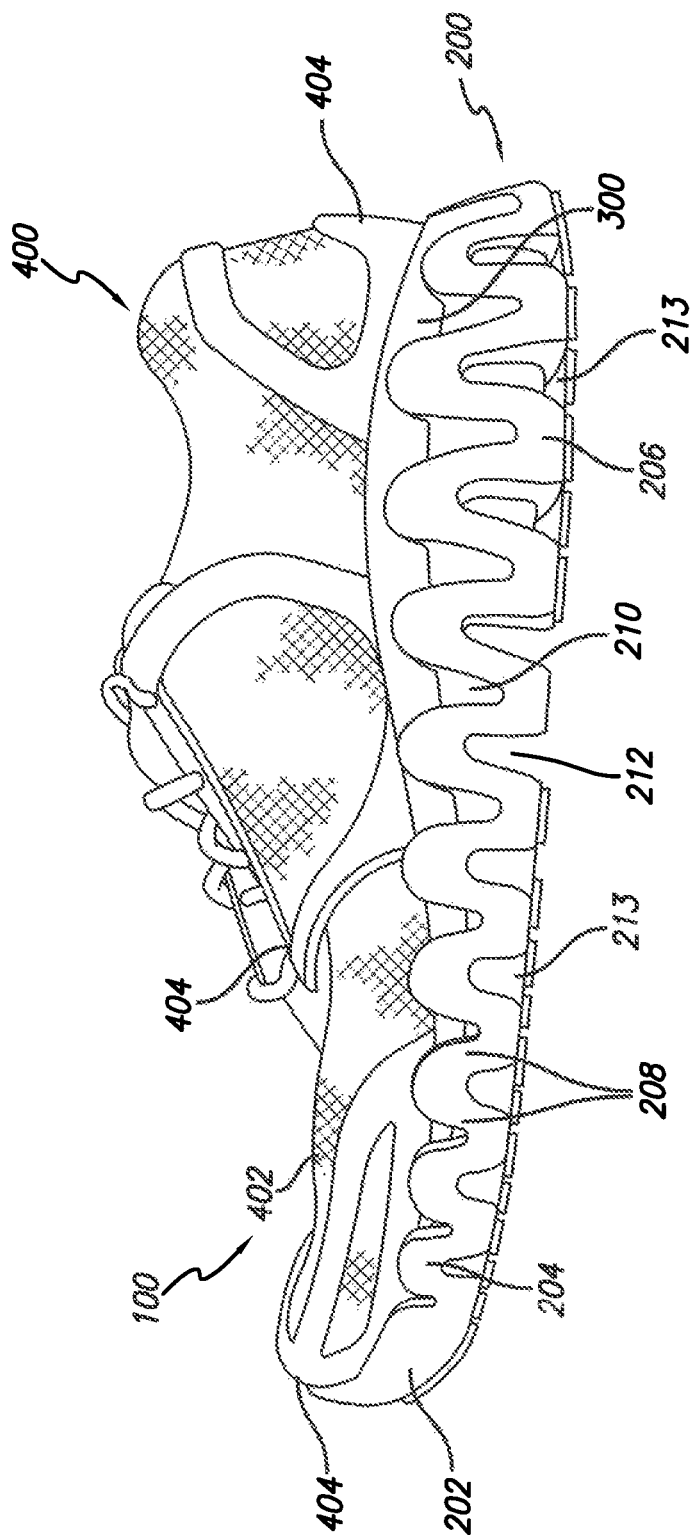
FIG. 6 is a side view of another exemplary article of footwear according to an embodiment of the present invention.
Figure 7:
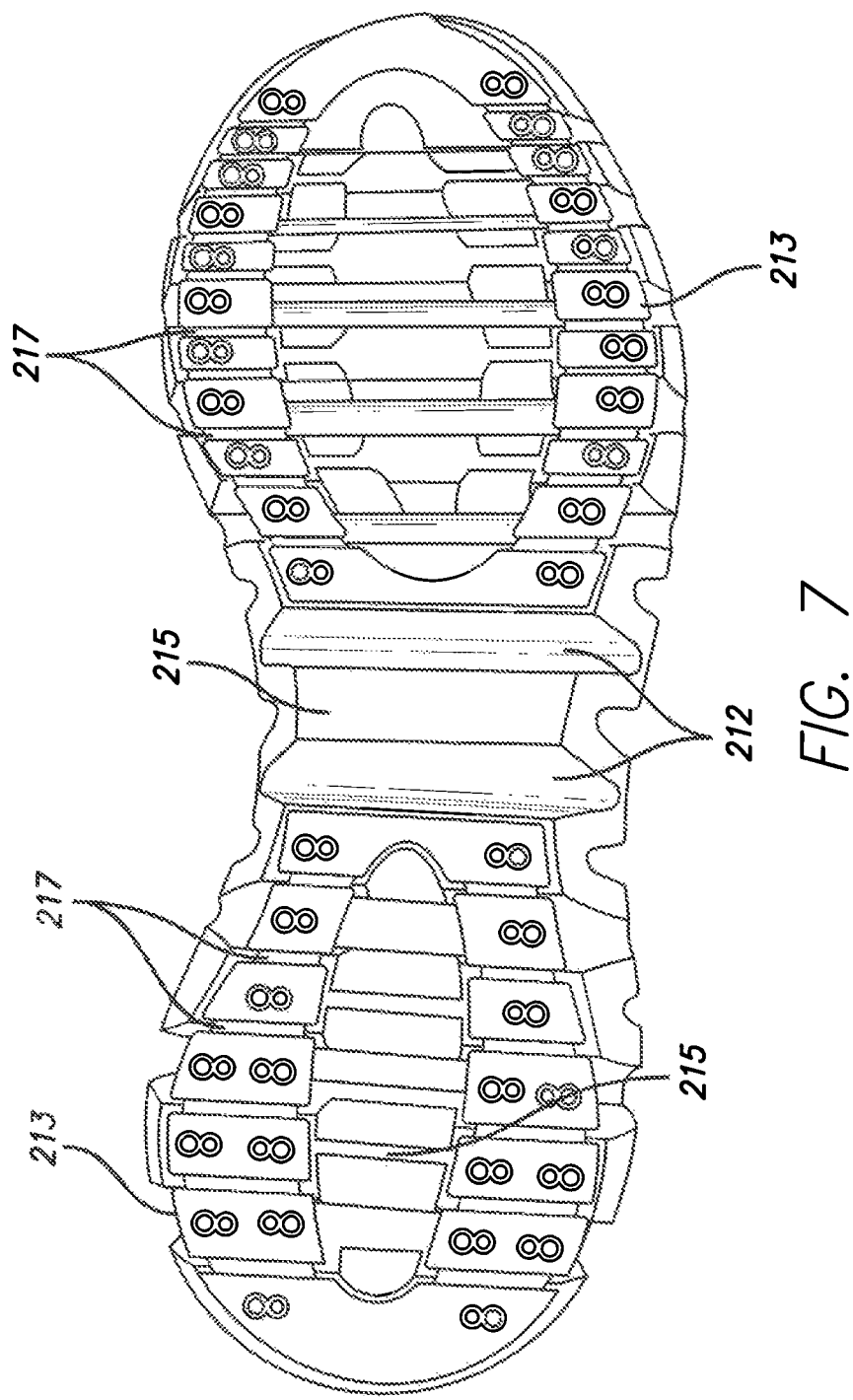
Figure 8:
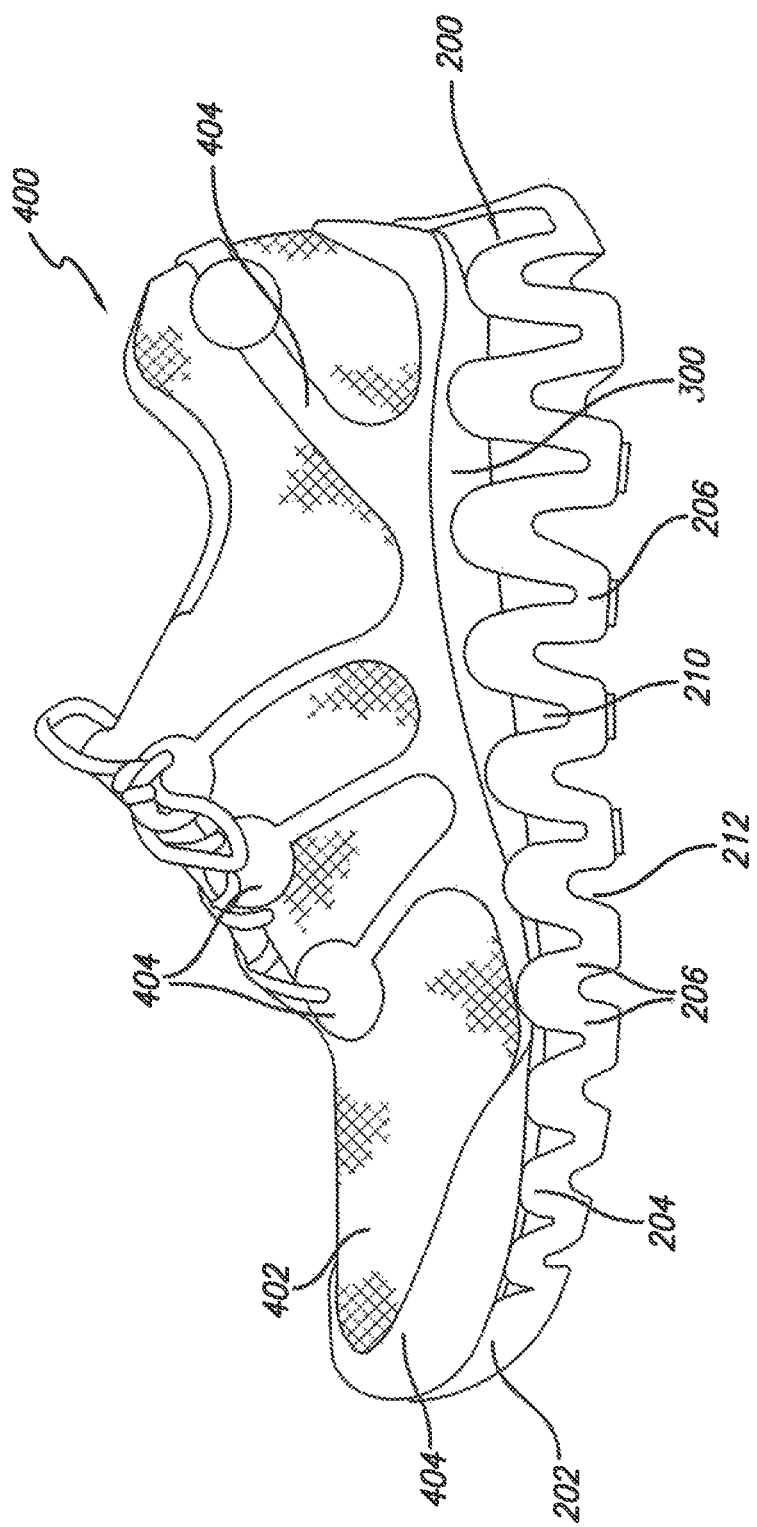
Figure 9:
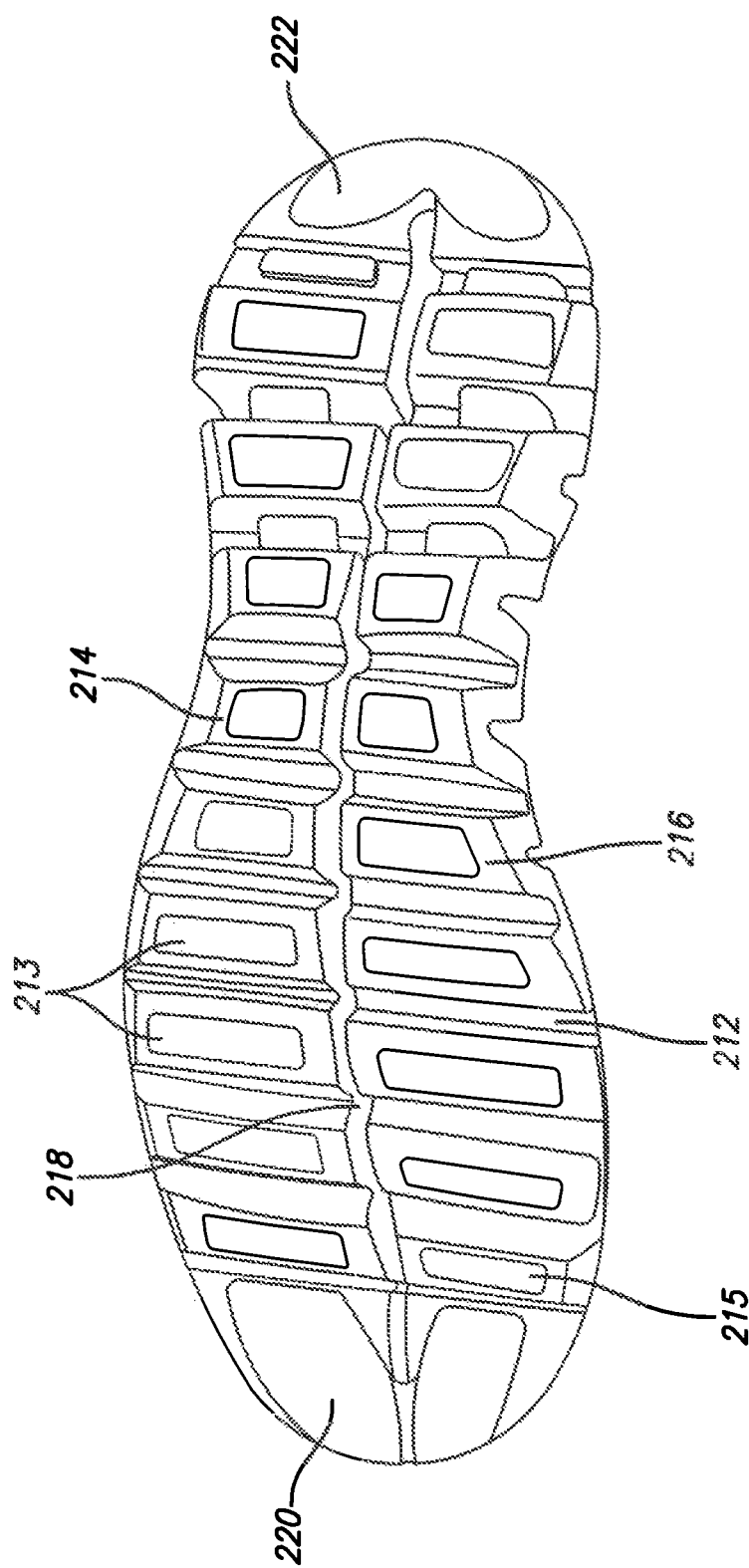
Figure 10:
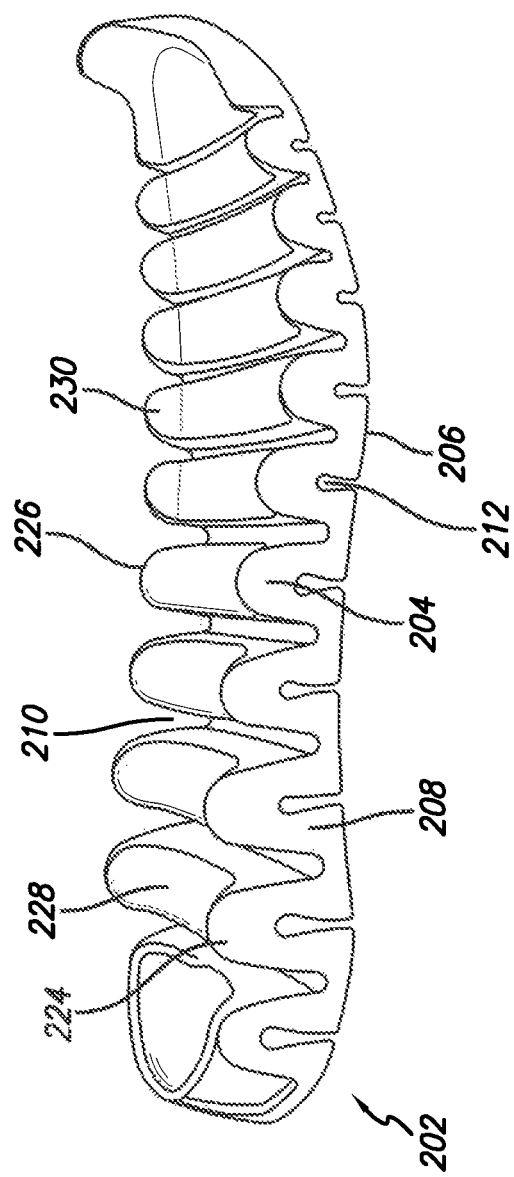
Figure 11:
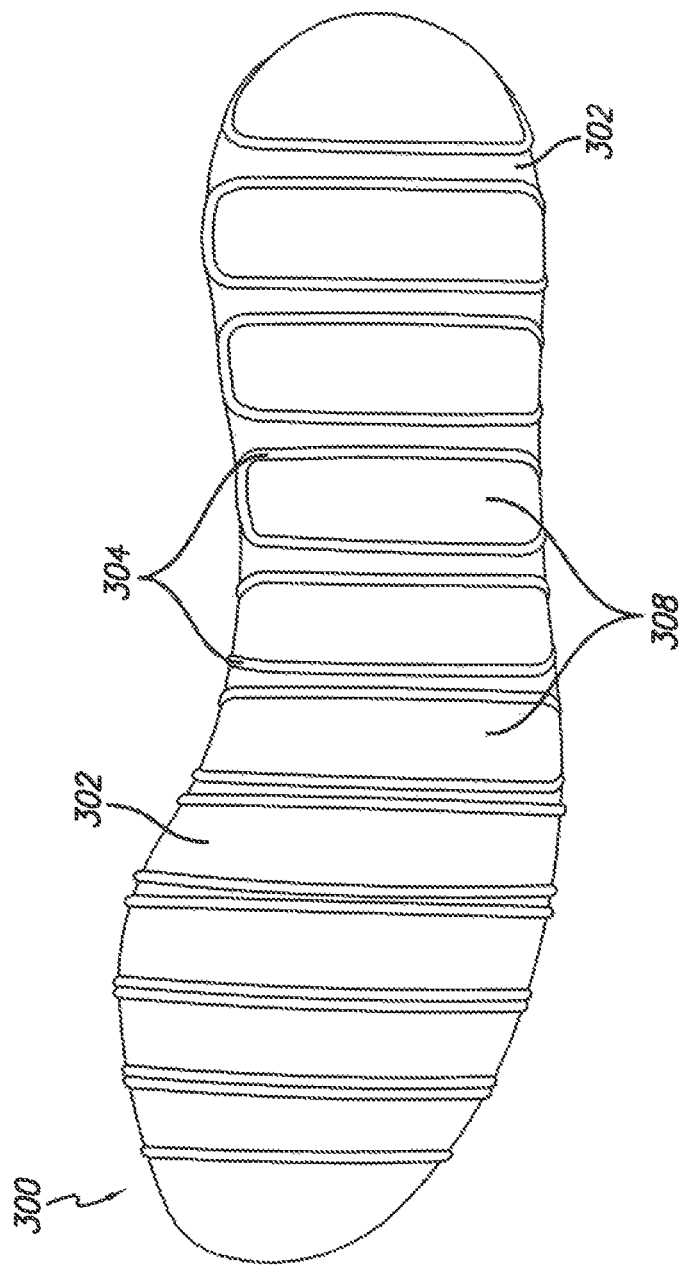
Figure 12:
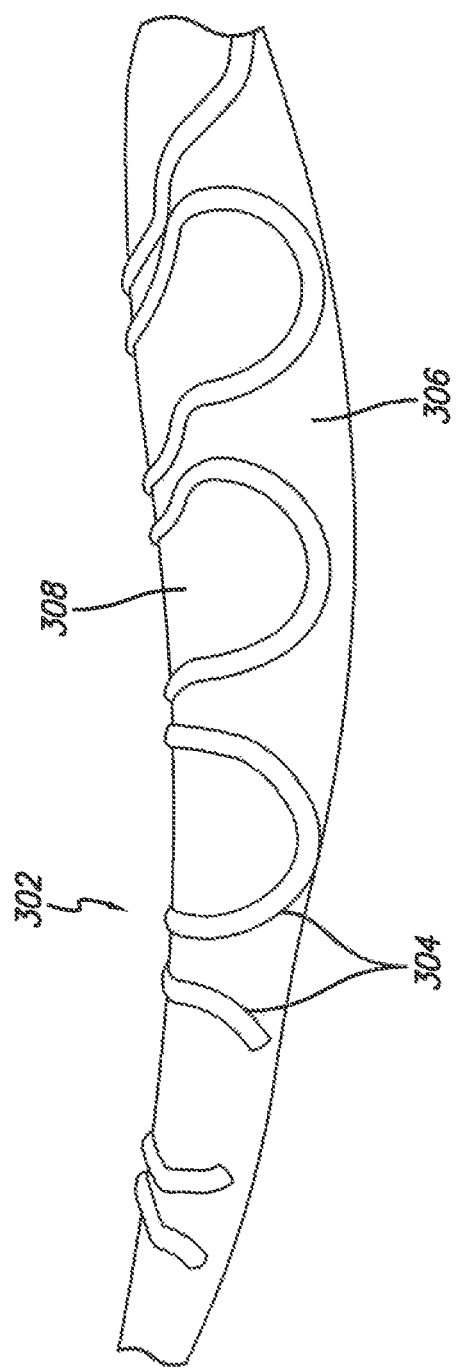

FIG. 7 a bottom view of the exemplary article of footwear of FIG. 6 according to an embodiment of the present invention;

FIG. 8 is a side view of another exemplary article of footwear according to an embodiment of the present invention;

FIG. 9 is a bottom view of the exemplary article of footwear of FIG. 8 according to an embodiment of the present invention;

FIG. 10 is a side view of an exemplary midsole according to an embodiment of the present invention;

FIG. 11 is a bottom view of an exemplary foot plate according to an embodiment of the present invention; and FIG. 12 is a partial side view of the exemplary foot plate of FIG. 11 according to an embodiment of the present invention.

Figure 13:
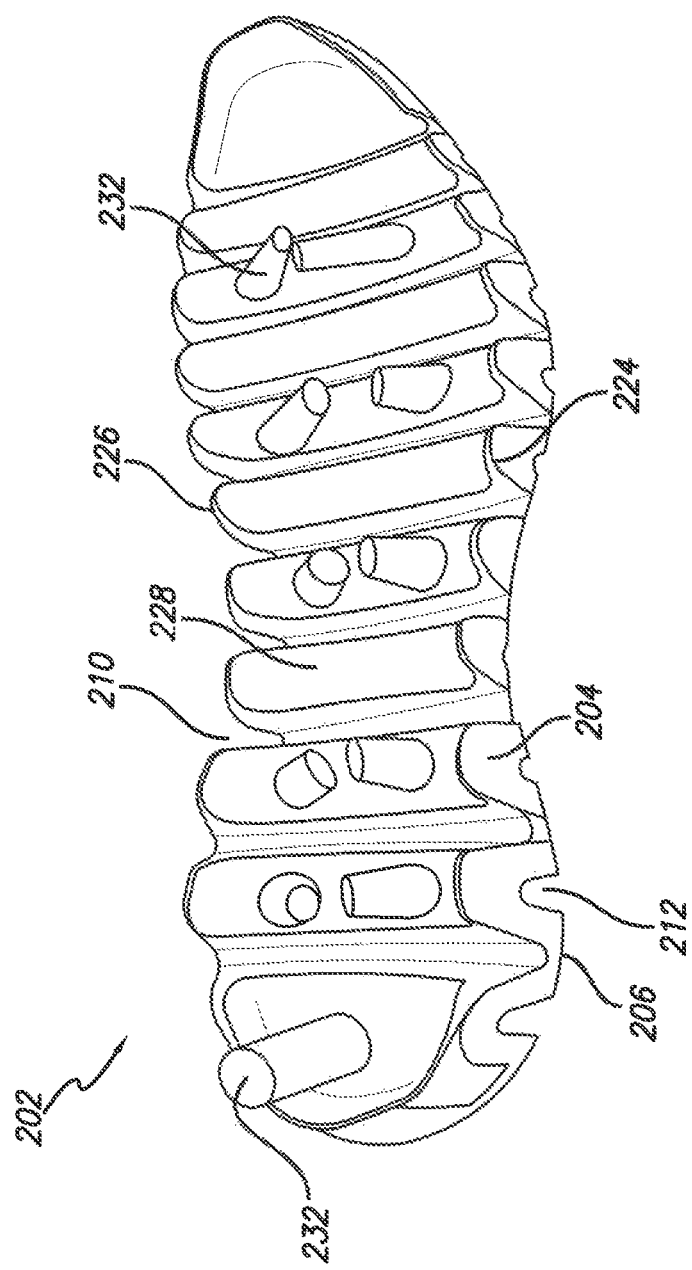

FIG. 13 is a schematic view of an exemplary article of footwear during manufacturing according to an embodiment of the present invention.

Figure 14:
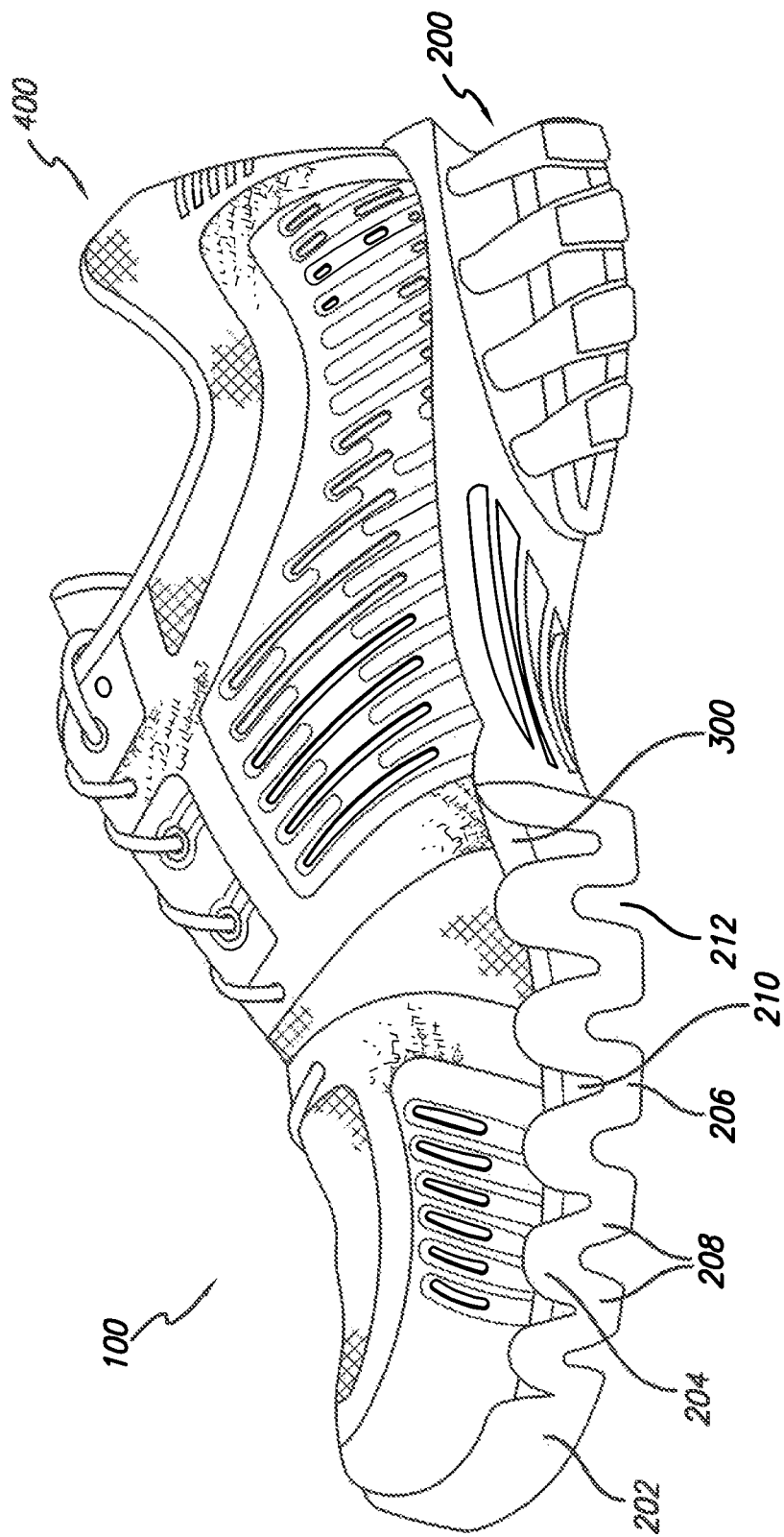

FIG. 14 is a side view of an exemplary article of footwear according to an embodiment of the present invention.

Figure 15:
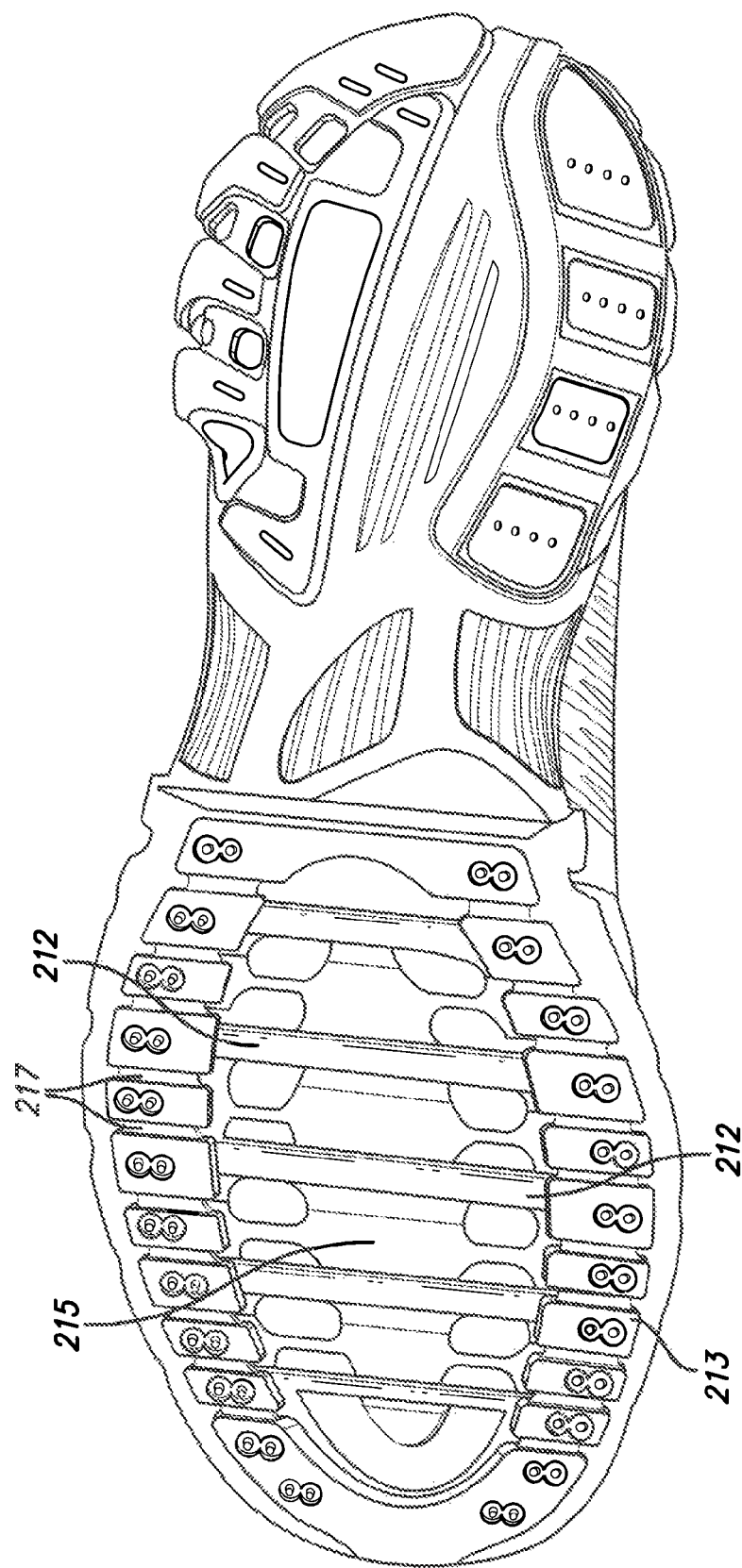

FIG. 15 is a bottom view of the exemplary article of footwear of FIG. 14 according to an embodiment of the present invention.

Figure 16:
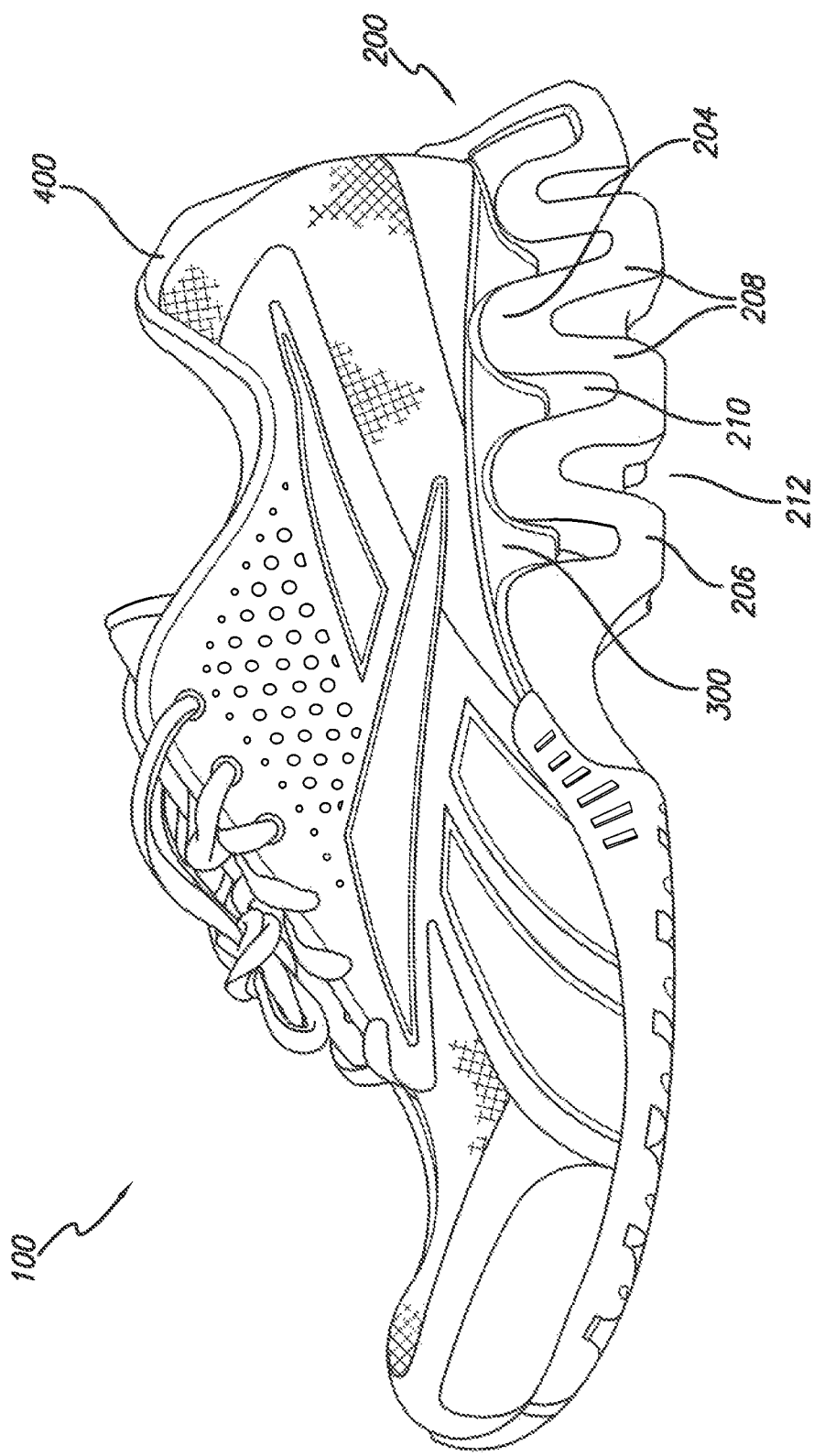

FIG. 16 is a side view of an exemplary article of footwear according to an embodiment of the present invention.

Figure 17:
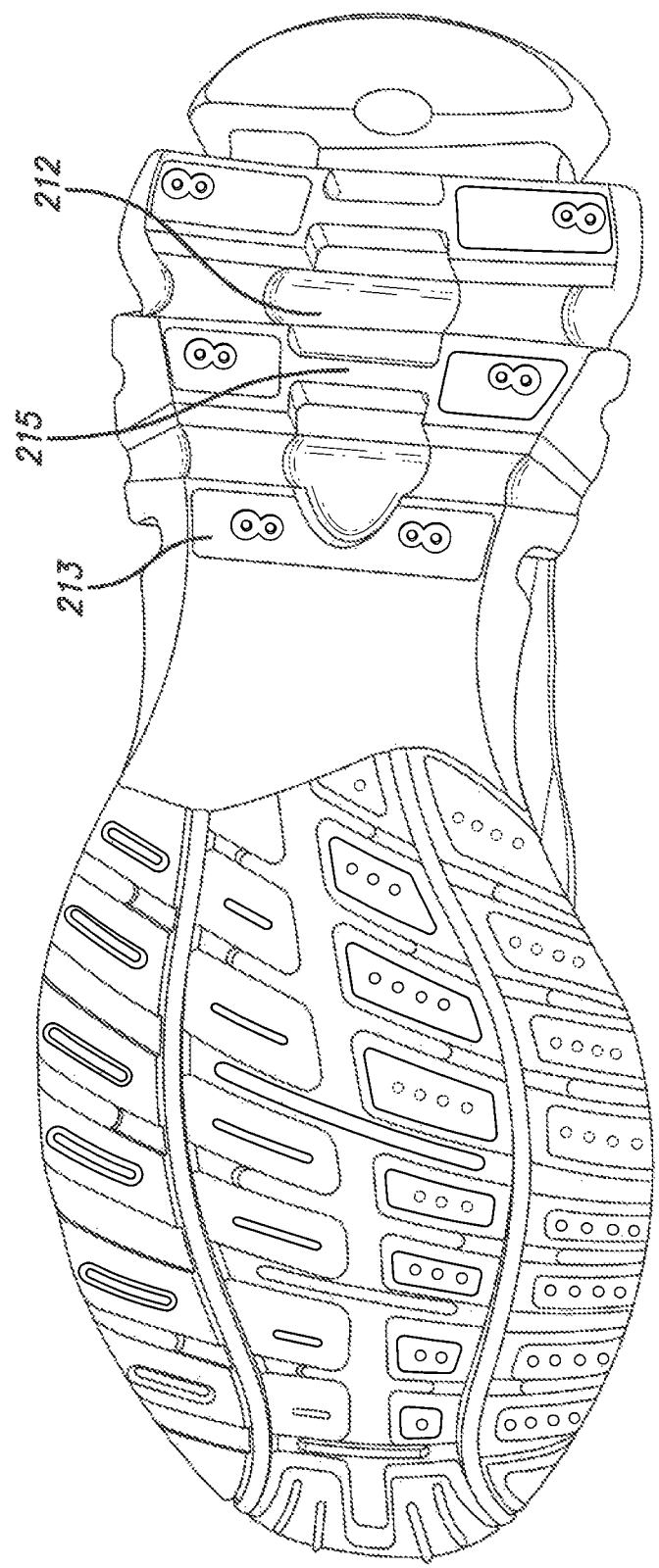

FIG. 17 is a bottom view of the exemplary article of footwear of FIG. 16 according to an embodiment of the present invention.

Figure 18:
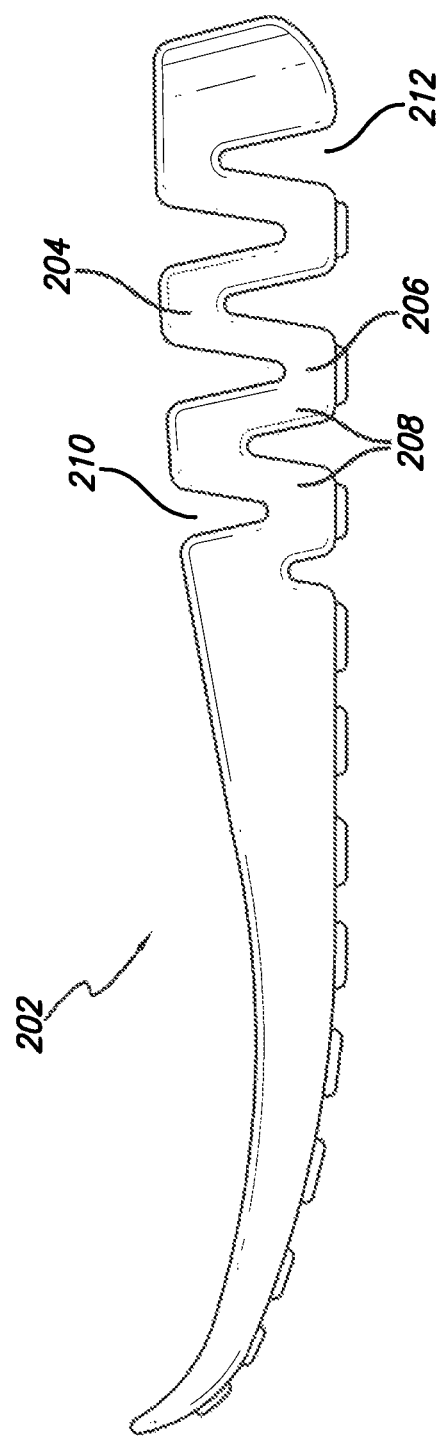

FIG. 18 is a side view of an exemplary midsole for use in the exemplary, article of footwear of FIG. 16 according to an embodiment of the present invention.

Figure 19:
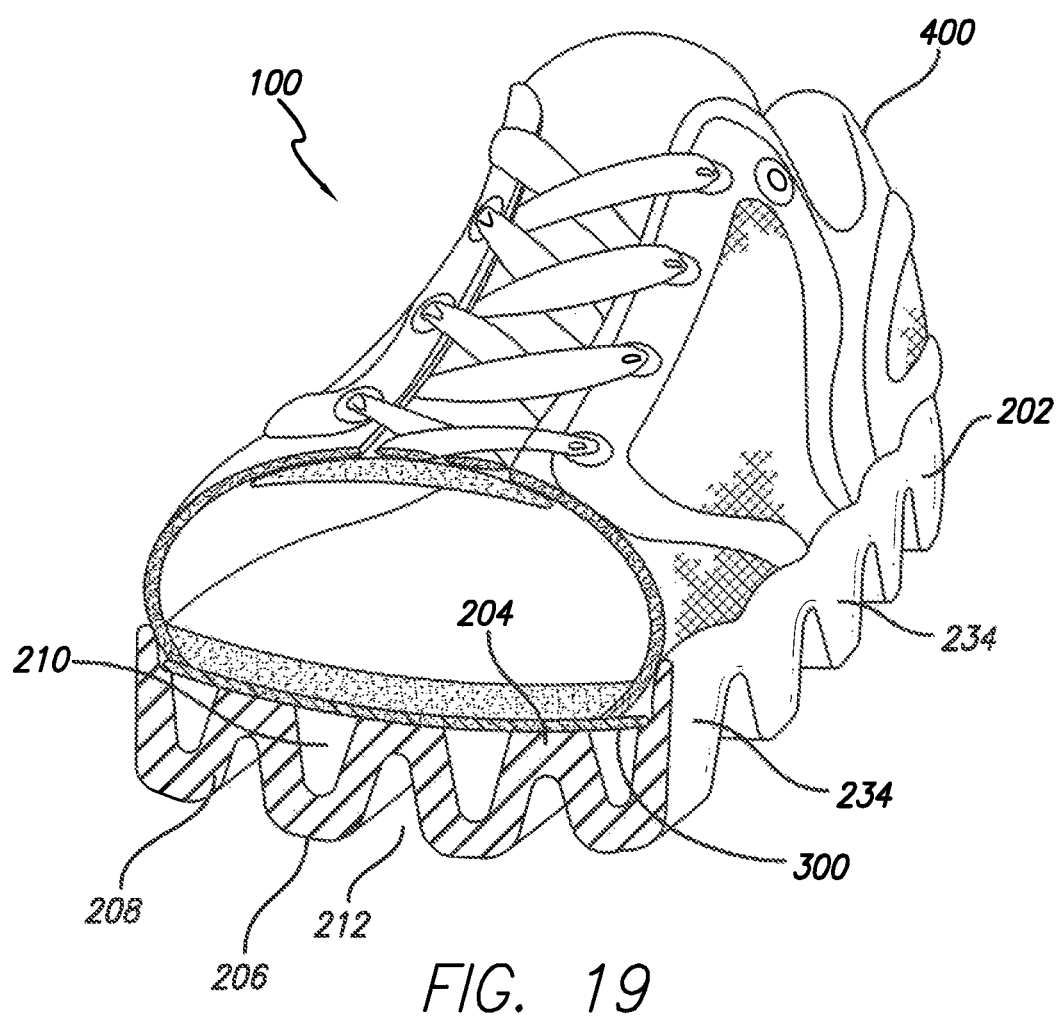

FIG. 19 is front perspective cross-sectional view of an exemplary article of footwear according to an embodiment of the present invention.

Figure 20:
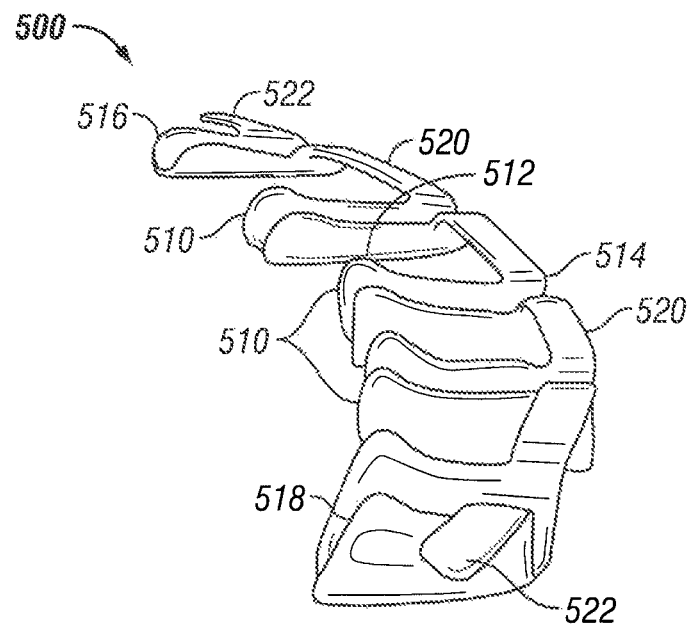

FIG. 20 is a top perspective view of an insert according to an embodiment of the present invention.

Figure 21:
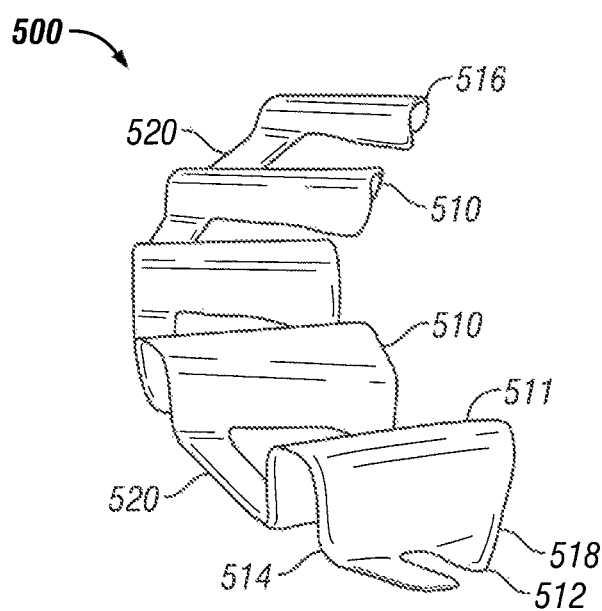

FIG. 21 is a bottom perspective view of the insert shown in FIG. 20 according to an embodiment of the present invention.

Figure 22:
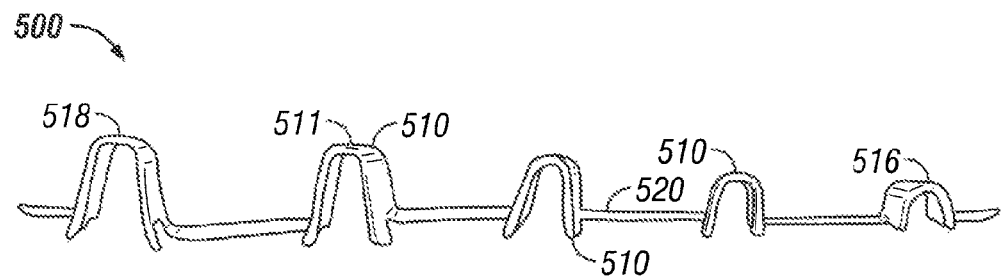

FIG. 22 is a side view of the insert shown in FIG. 20 according to an embodiment of the present invention.

Figure 23:
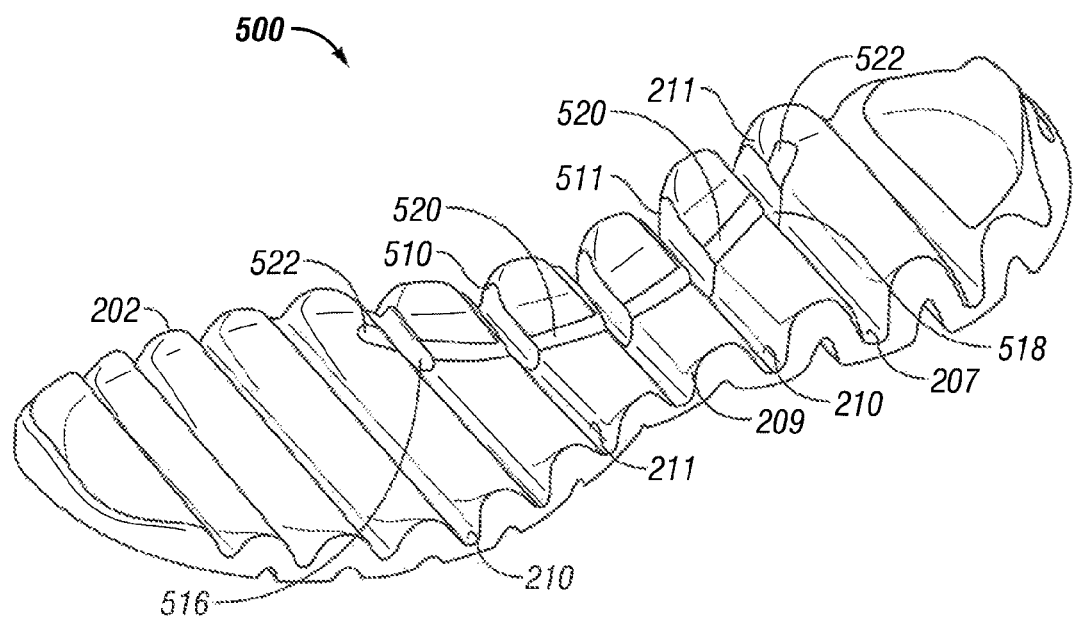

FIG. 23 is a top perspective view of a midsole with an insert according to an embodiment of the present invention.

Figure 24:
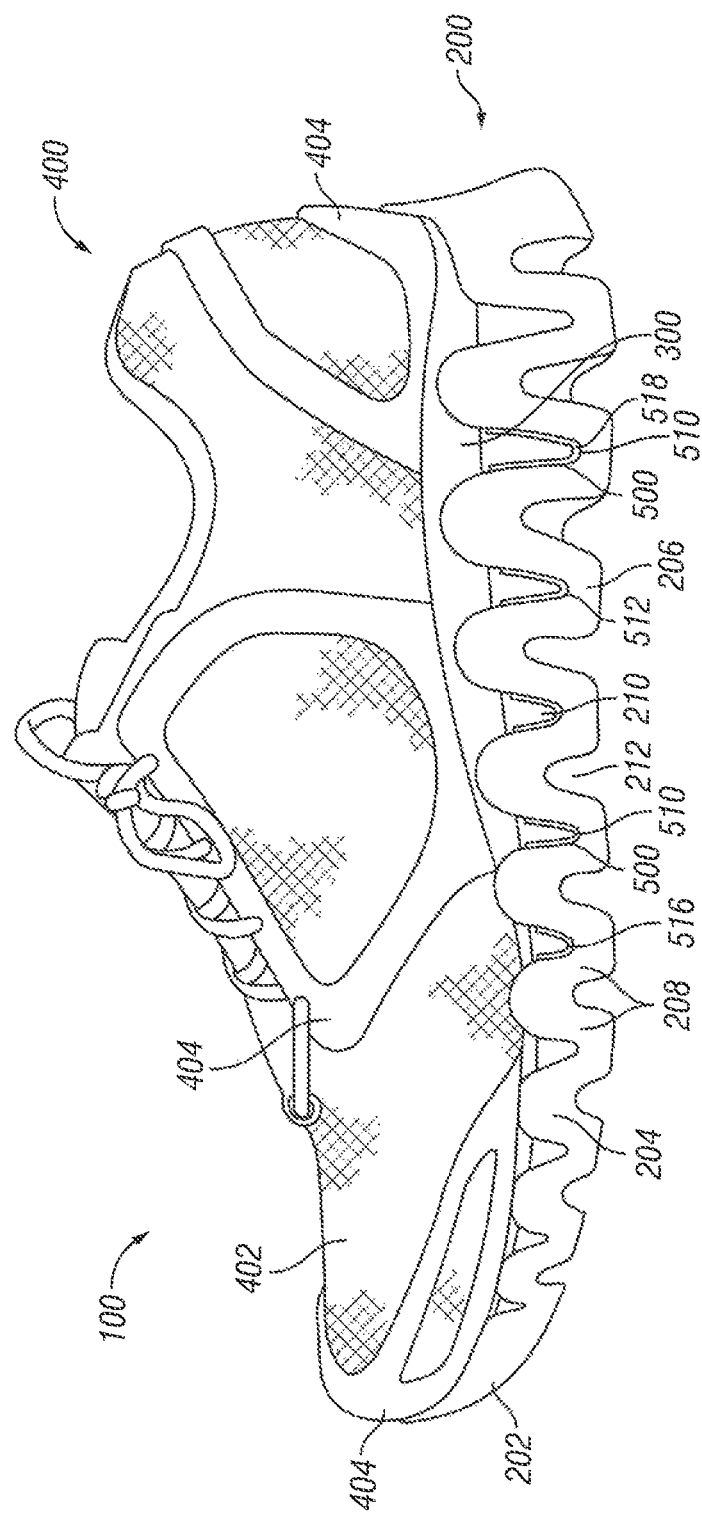

FIG. 24 is a side view of an article, of footwear with an insert according to an embodiment of the present invention.

Figure 25:
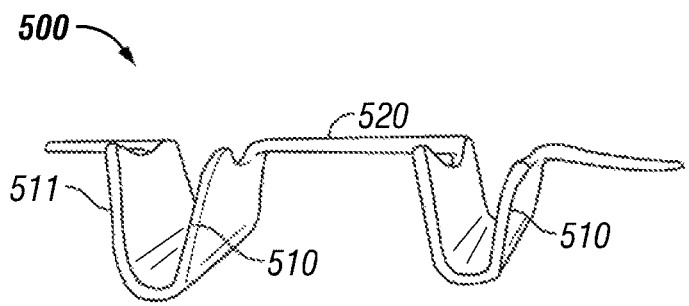

FIG. 25 is a side view of an insert according to an embodiment of the present invention.

Figure 26:
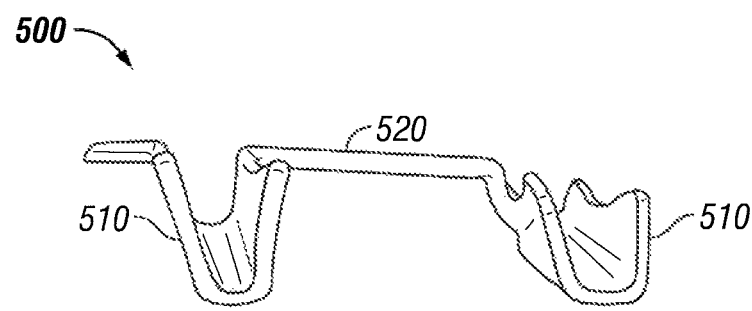

FIG. 26 is a side view of an insert according to another embodiment of the present invention.

Figure 27:
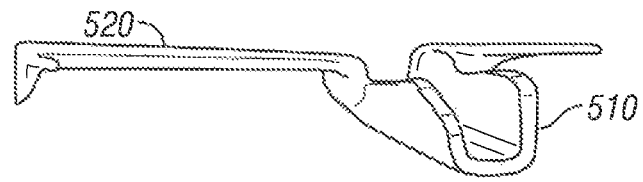

FIG. 27 is a side view of an insert according to another embodiment of the present invention.

Figure 28:
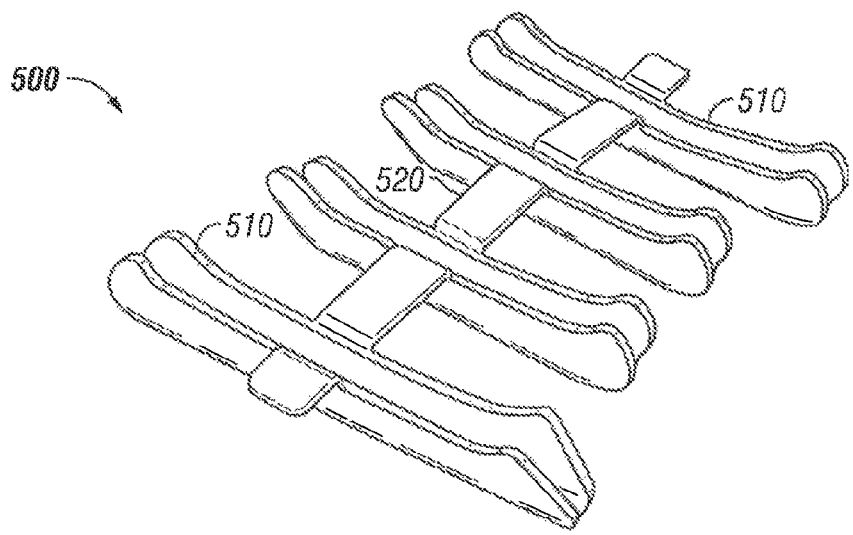

FIG. 28 is a top perspective view of an insert according to another embodiment of the present invention.

Figure 29:
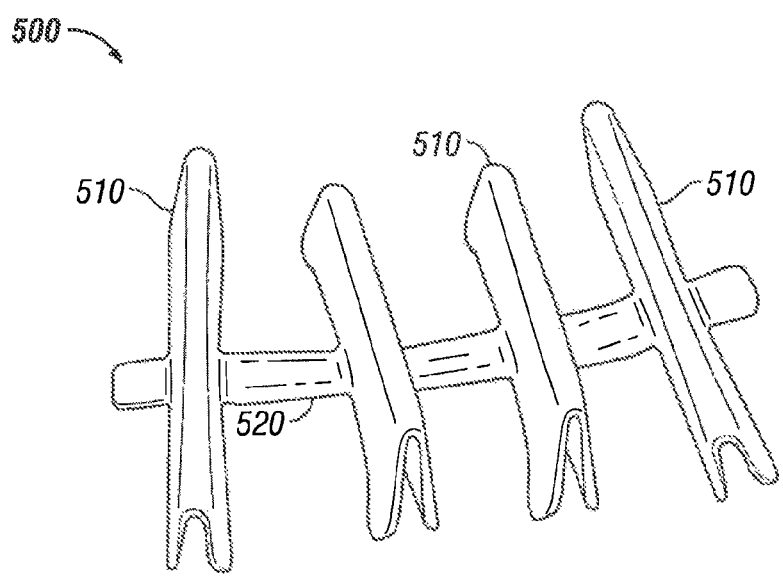

FIG. 29 is a bottom perspective view of the insert shown in FIG. 29 according to an embodiment of the present invention.

Figure 30:
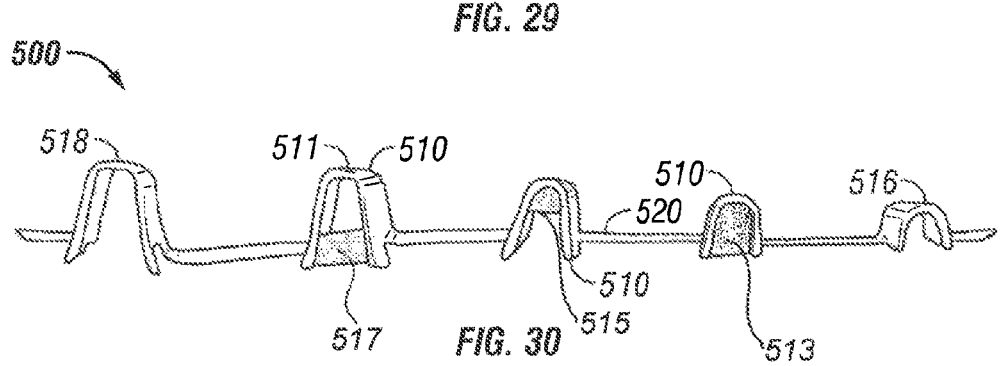

FIG. 30 is a side view of an insert having solid support elements according to an embodiment of the present invention.

Figure 31:
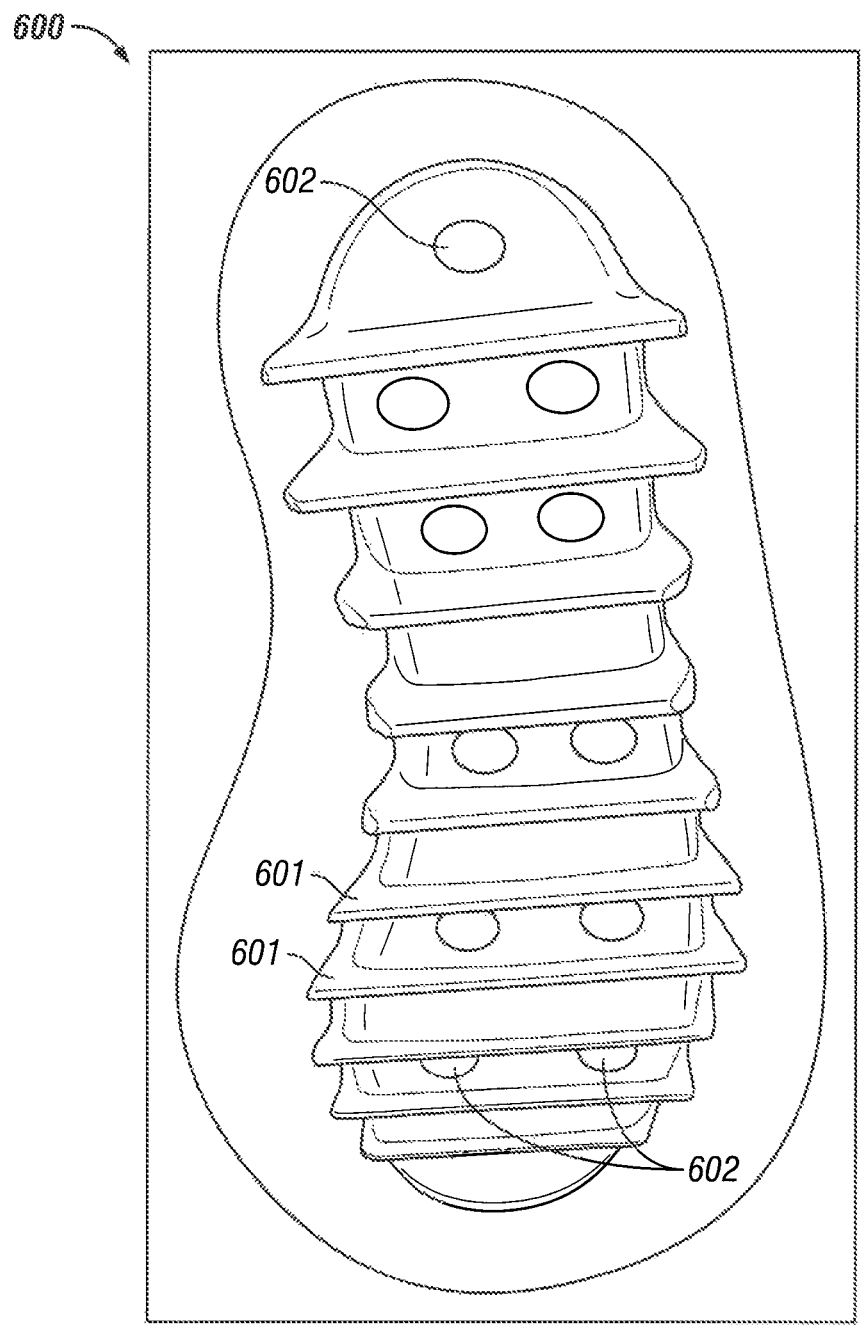

FIG. 31 is a schematic view of an exemplary mold for manufacturing a sole according to an embodiment of the present invention.

Figure 32:
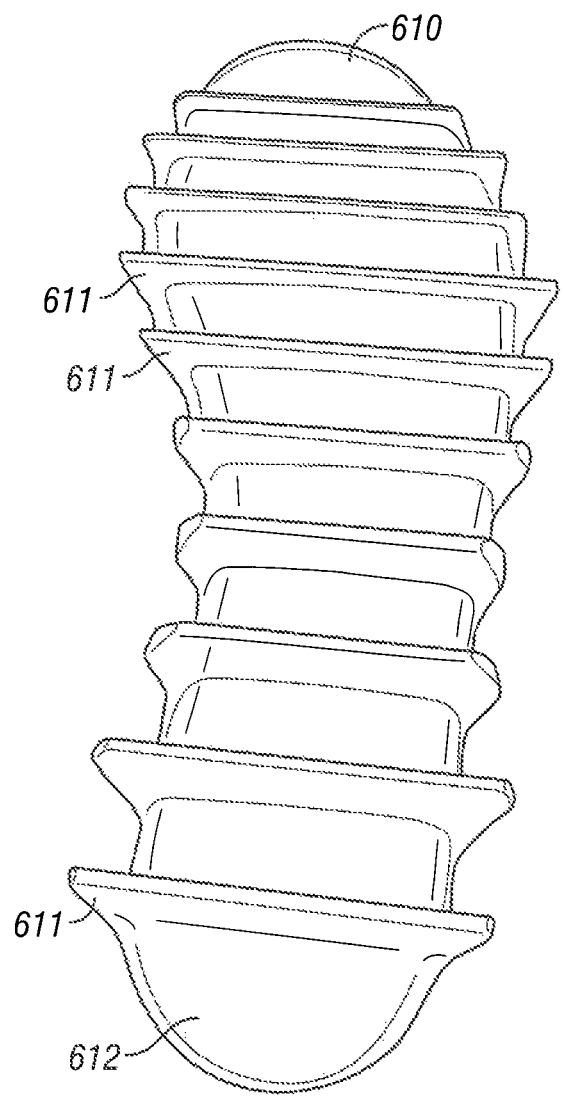

FIG. 32 is a schematic view of exemplary post-molding form for manufacturing a sole according to an embodiment of the present invention.

Figure 33:
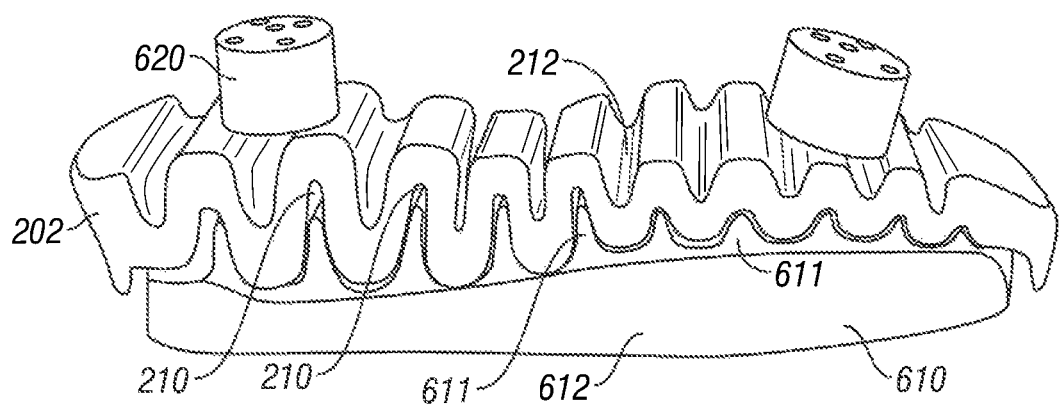

FIG. 33 a schematic view of an exemplary sole during manufacturing according to an embodiment of the present invention.

Figure 34:
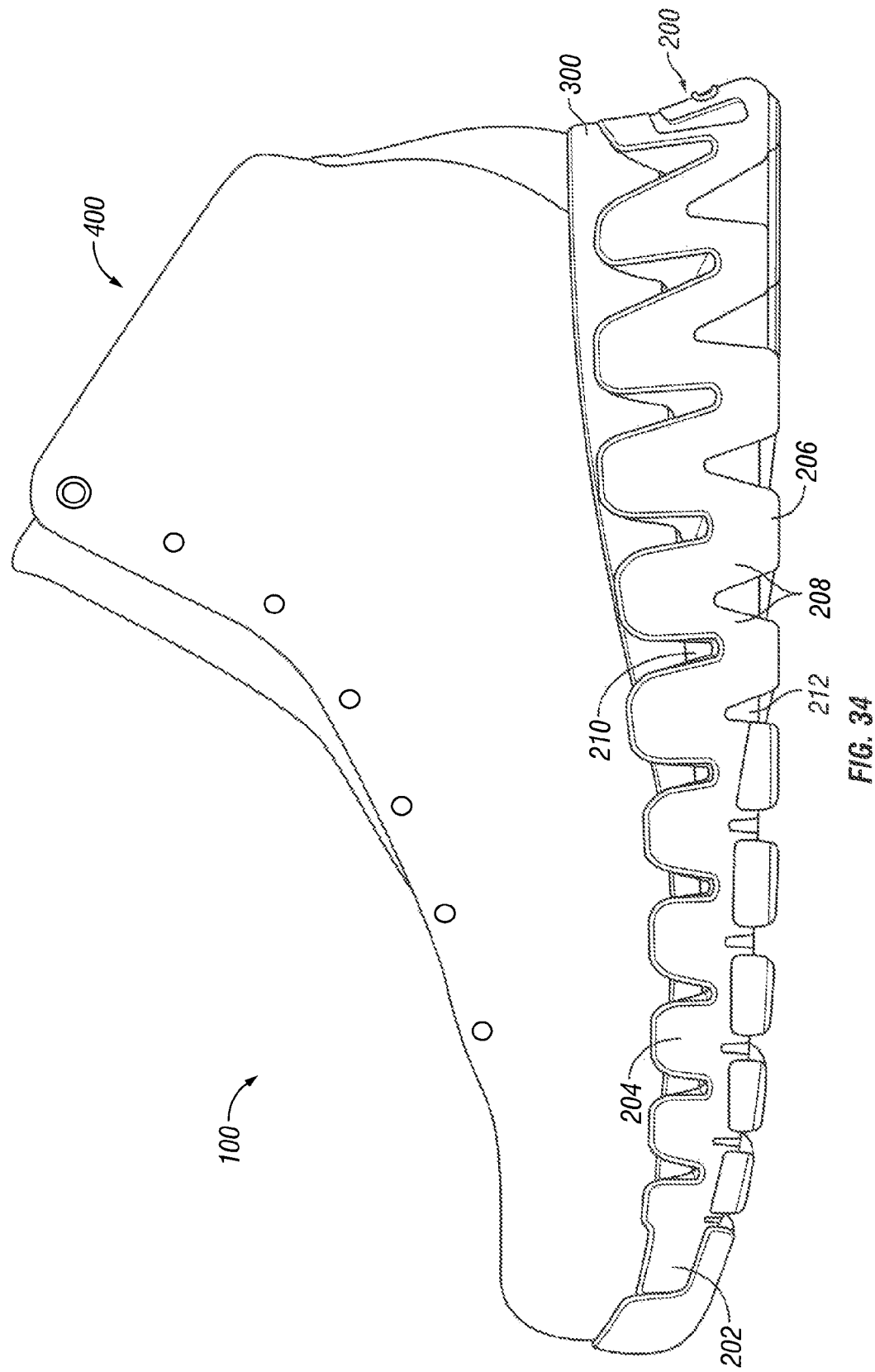
Figure 35:
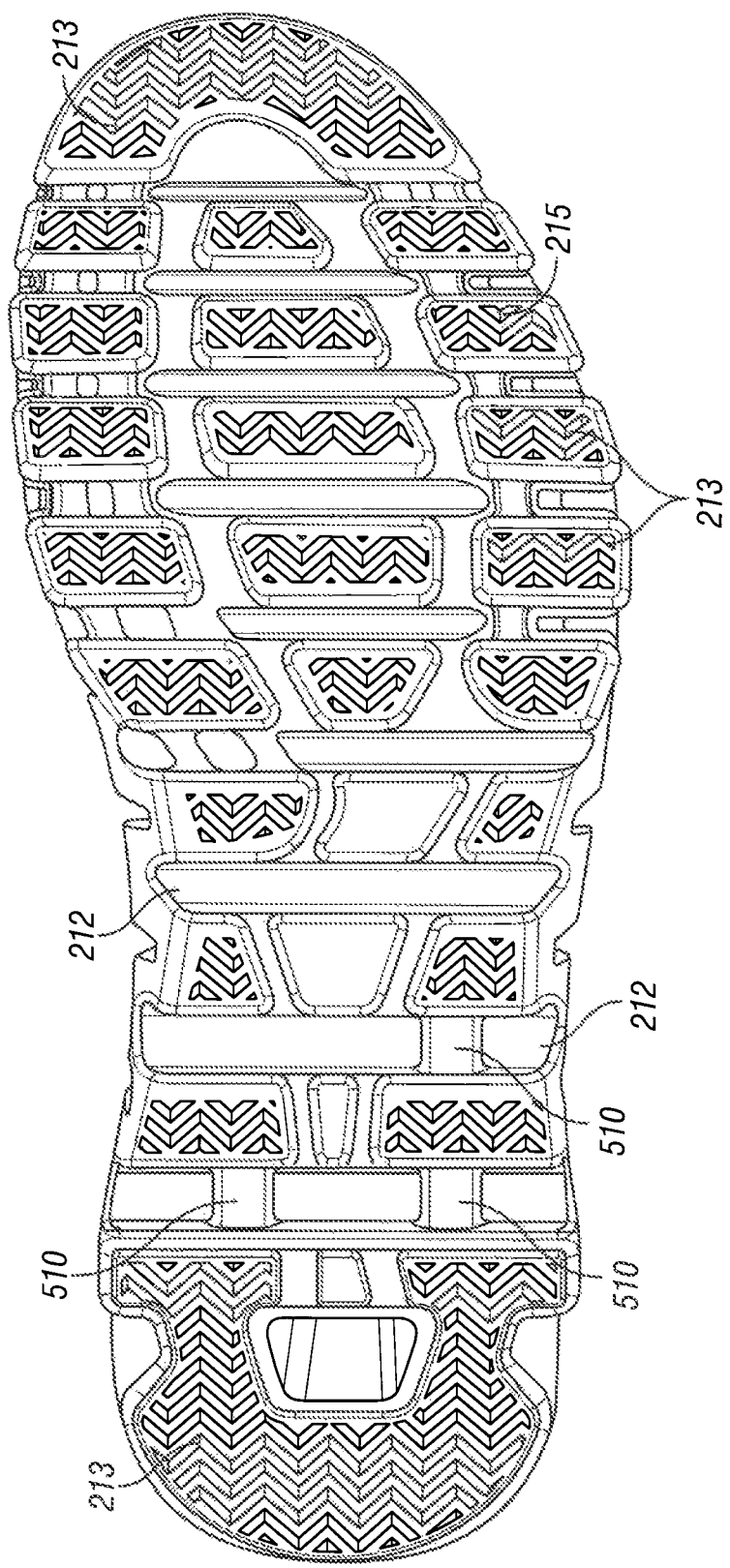

FIG. 34 is a side view of an exemplary article of footwear according to an embodiment of the present invention FIG. 35 is a bottom view of an exemplary article of footwear and outsole according to an embodiment of the present invention.

DETAILED DESCRIPTION OF THE INVENTION

The present invention is now described with reference to the Figures, in which like reference numerals are used to indicate identical or functionally similar elements. While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

An article of footwear 100 according to an embodiment of the present invention may have a sole 200 that undulates to provide a different and unique ride and/or feel to article of footwear 100 while also providing a unique aesthetic appeal and providing training for the wearer's muscles in the legs, lower back, and/or abdomen. A foot plate 300 is attached to undulating sole 200 and an upper 400 is attached to foot plate 300.

Sole 200 may include a midsole 202 having an undulating shape with alternating peaks 204 and troughs 206. In some embodiments, the undulating shape of midsole 202 may be substantially sinusoidal, whereby one or more of the peaks and/or troughs may be rounded. In other embodiments, one or more of the peaks and/or troughs may have a top surface that is substantially flat, as shown for example, in FIG. 34. In other embodiments, the undulating shape of midsole 202 may be zigzagged, whereby one or more of the peaks and/or troughs may be pointed. In some embodiments, peaks 204 may be located substantially equidistant between adjacent troughs 206, and similarly, troughs 206 may be located substantially equidistant between adjacent peaks. Between each peak 204 and each trough 206 may be a wall 208. Gaps 210 devoid of material may be present between adjacent peaks 204 and above a trough 206 and gaps 212 devoid of material may be present between adjacent troughs 206 and below a peak 204. Gaps 210 and gaps 212 may extend across an entire width of midsole 202. In an alternative embodiment, gaps 210 and gaps 212 may extend only along a portion of midsole 202. In one embodiment, the undulating shape of midsole 202 may be substantially similar to a sine wave. A distance between adjacent peaks 204 or adjacent troughs 206 may be substantially similar or may be varied along a length of midsole 202 or combinations thereof.

Midsole 202 may be designed such that each trough 206 contacts or engages the ground separately when a user is walking, running, or otherwise moving under his/her own power. As each trough 206 contacts or engages the ground a compressive force is exerted causing distortion of the shape of gap 210 located above trough 206 as a result of vertical buckling of walls 208 connected to trough 206. The compressive forces can also distort the shape of gaps 212 on either side of trough 206 to increase the distance between the trough 206 contacting or engaging the ground and, those adjacent to it. Shear forces exerted on midsole 202 may have the same effect of buckling walls 208 and distorting the shape of gaps 210 and 212.

Accordingly, material for midsole 202 must be sufficiently flexible to allow the buckling and distortions described above so as to provide adequate cushioning. Suitable material for midsole 202 may include, but is not limited to, foam and thermoplastic polyurethane. When midsole 202 is a foam, the foam may be, for example, ethyl vinyl acetate (EVA) based or polyurethane (PU) based and the foam may be an open-cell foam or a closed-cell foam. In other embodiments, midsole 202 may be elastomers, thermoplastic elastomers (TPE), foam-like plastic (e.g., Pebax® foam or Hytrel® foam) and gel-like plastics.

Individually or in combination, the aspects of midsole 202 that uniquely absorb the compressive and shear forces may include the: (1) tall, thin shape of walls 208, (2) angles between adjacent walls 208 of undulating midsole 202, (3) gaps 210 and 212 void of material on either side of walls 208; and/or (4) compression of the foam itself (aside from distortion of the sole geometry). Buckling may occur due to tall, thin walls 208. The voids of material or gaps 210, 212 may allow for the buckling and/or distention of the material of midsole 202 to occur when loaded. The contact of midsole 202 on the ground in the midfoot region may provide a new ride to the shoe. The heel strike may take a prolonged amount of time compared to a typical running shoe, which can decrease the peak forces. When a force is applied to the midsole, not only does the midsole material compress, but the physical shape of the midsole may also change to absorb the compressive and shear forces. The physical changes in shape, and/or the buckling, which may include walls 208 distending into one of the voids of material or gaps 210, 212 on either side of the wall, may occur because of the tall, thin shape of walls 212, angles between walls 208 of the undulating midsole 202, and/or voids of material or gaps 210, 212 on either side of walls 208. The unique shape, midsole contact with the ground in the midfoot region, and/or material may vary the amount of time spent in each phase of the gait cycle for an individual compared to a more traditional running shoe, possibly decreasing the peak force experienced by that individual.

The above described effects of the compressive forces and shear forces on midsole 202 may cause the wearer's body to work harder. By forcing the wearer's body to work harder, the shoe may trigger increased training to the muscles, such as those muscles in the wearer's calves, thighs, lower back, buttocks, and/or abdomen. As a result of this extra work, when a wearer travels a given distance, the affected muscles may feel like they have worked in traversing a distance farther than the given distance, thereby enhancing a wearer's amount of exercise. In another embodiment, forces acting on midsole 202 may cause the wearers' body to work less hard. For example, midsole 202 may be adapted to enhance the natural resiliency and energy return of the foot by storing energy during its compression and returning energy during its expansion. As a result, muscles used during an activity may undergo less wear.

Figure 1:
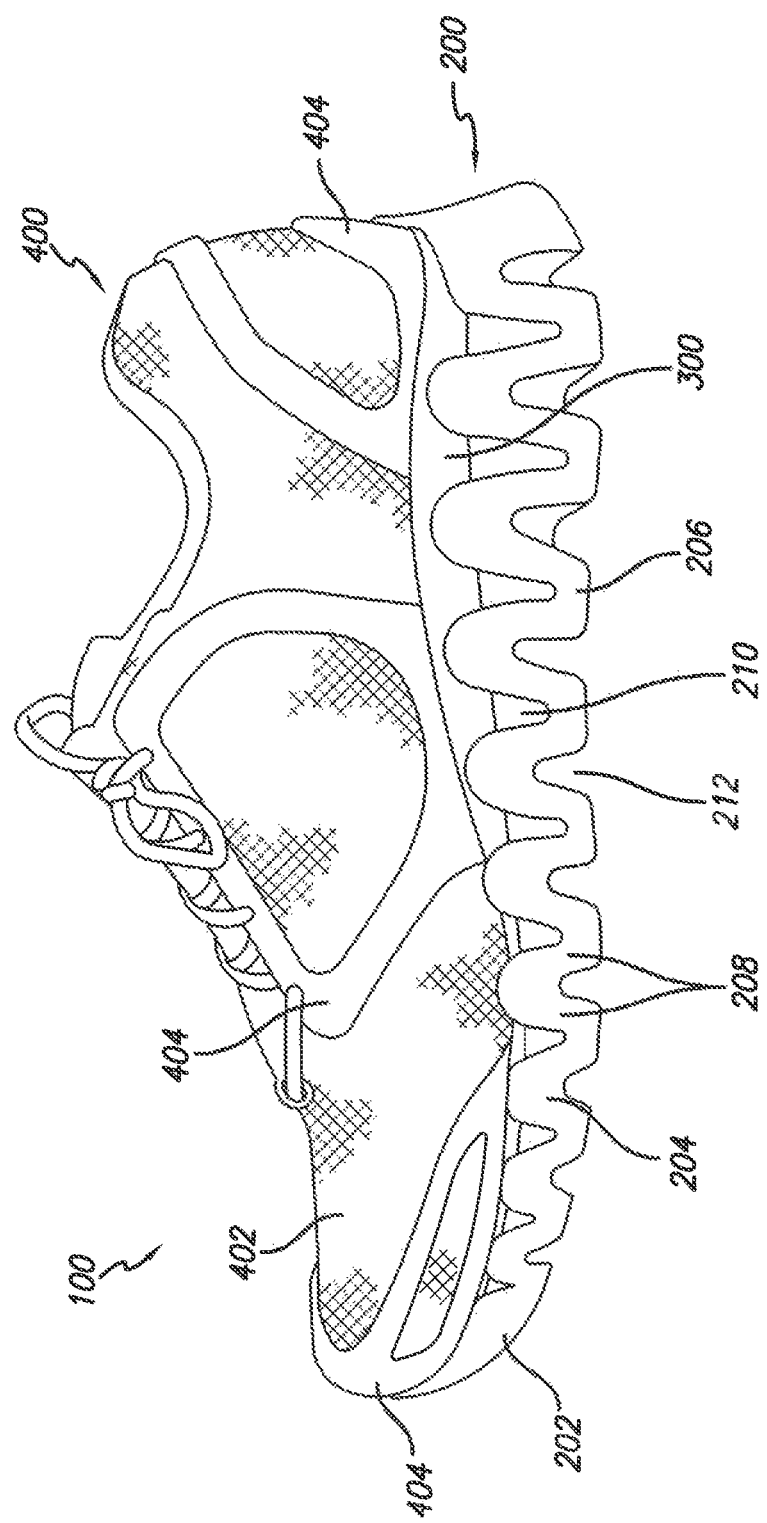
FIG. 1 is a side view of an exemplary article of footwear according to an embodiment of the present invention.

Walls 208 may be contoured to provide gaps 210 and gaps 212 with a variety of shapes in order to impart varying cushioning effects. In one embodiment, as shown for example in FIGS. 1 and 6, gaps 210 may be substantially v-shaped. The angle provided between adjacent walls 208 may be adapted to provide the desired cushioning properties. For example, in one embodiment the angle between adjacent walls 208 may be in the range of from about 10 degrees to about 50 degrees, such as from about 10 degrees to about 40 degrees or about 15 degrees to about 35 degrees. In one embodiment, the angle between adjacent walls may vary along the length of midsole 202. For example, in one embodiment the angle may be greater between one or more pair of adjacent walls 208 in the heel portion of midsole 202 and lesser between one or more pair of adjacent walls 208 in the forefoot portion. For example, in some embodiments the angle between adjacent walls 208 in the forefoot portion may be from about 30 to about 40 degrees. In some embodiments the angle between adjacent walls 208 in the heel portion may be from about 15 to about 25 degrees. In another embodiment, as also shown for example in FIG. 1, gaps 212 may be substantially shaped as an inverted v.

The depth of gaps 210 and 212 may also be varied to provide the desired cushioning properties. In one embodiment, as shown for example in FIG. 1, the depth of gaps 210 may vary along the length of midsole 202. For example, gaps 210 may be deeper in the heel region of midsole 202, and become more shallow toward the forefoot region of midsole 202.

Figure 3:
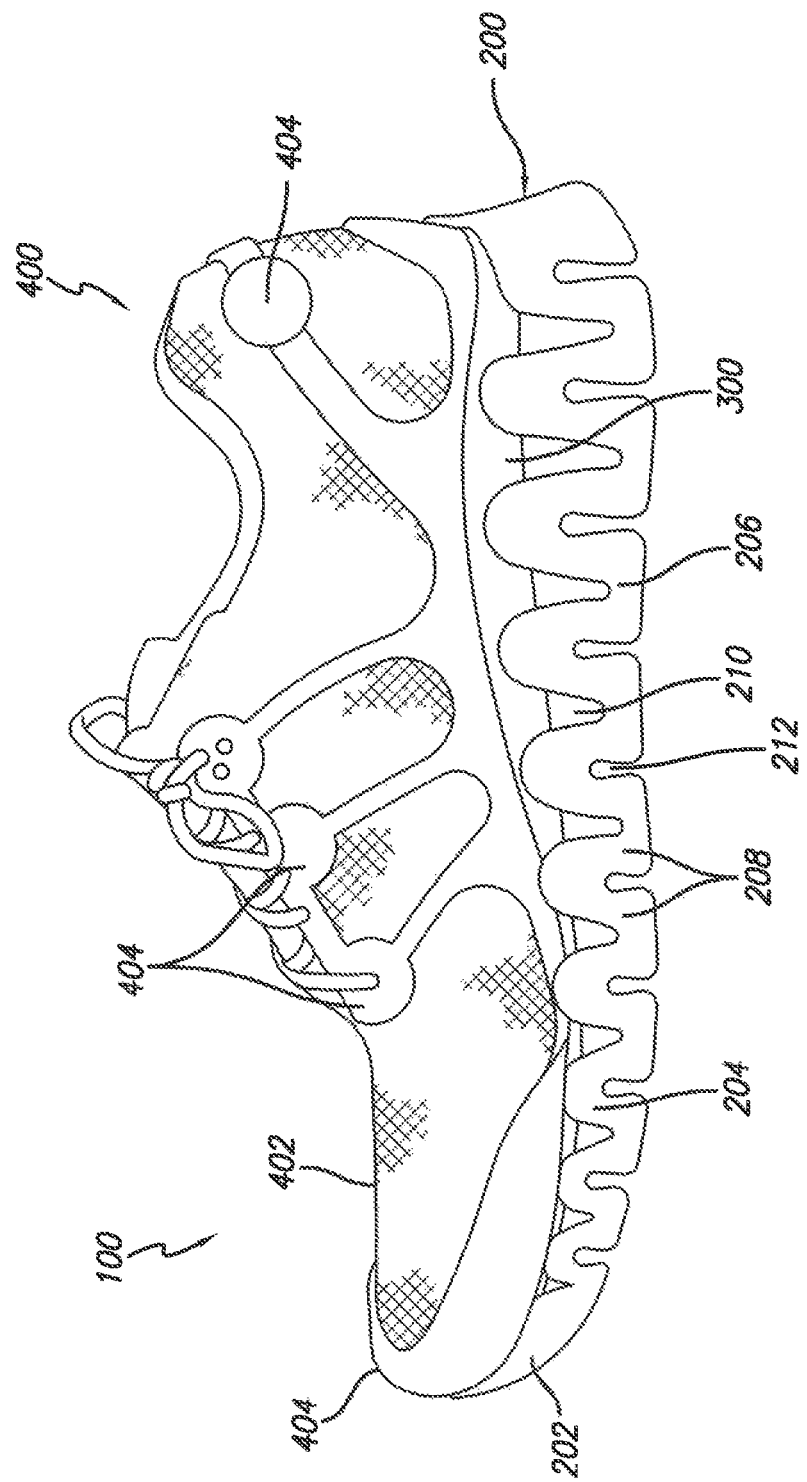
FIG. 3 is a side view of another exemplary article of footwear according to an embodiment of the present invention.
Figure 5:
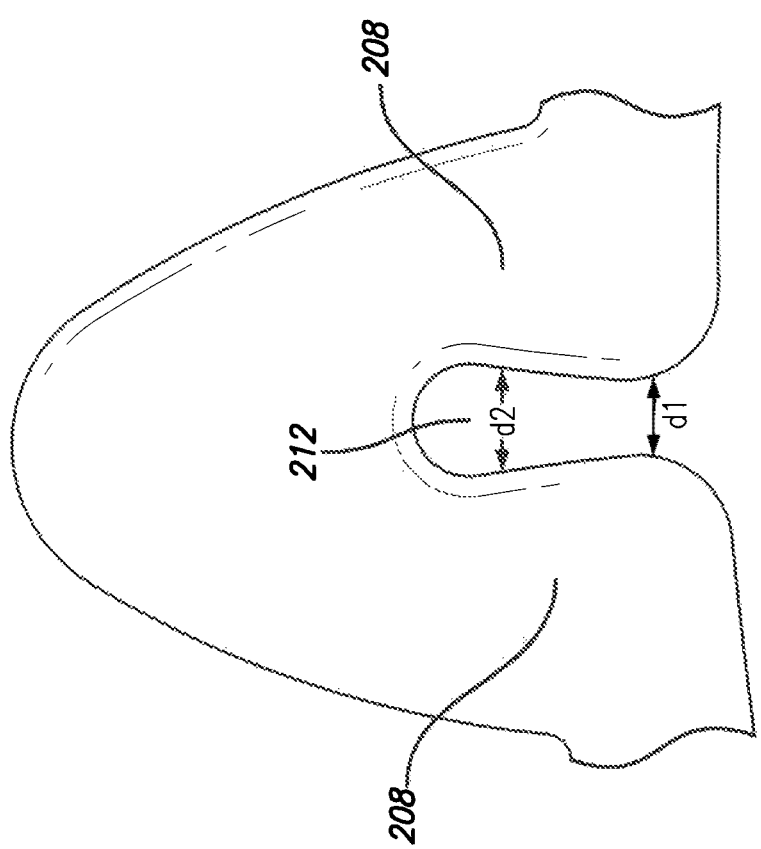
FIG. 5 is a close up side view of a portion of a midsole of the exemplary article of footwear of FIG. 3 according to an embodiment of the present invention.

In another embodiment, as shown for example in FIGS. 3 and 5, gaps 212 may be substantially omega-shaped (Ω) such that each gap 212 has a rounded top section and a narrow bottom section wherein the distance d1 between the surface of the two walls 208 forming and facing each gap 212 is shorter at the bottom of gap 212 than a distance d2 in a middle portion of gap 212. The embodiments described above are merely exemplary and gaps 210 and gaps 212 may have any combination of shapes as would be apparent to one of ordinary skill in the art. For example, in one embodiment midsole 202 may include a combination of v-shaped and omega-shaped gaps.

The number of walls 208, and, correspondingly, the number of gaps 210 and 212 provided in midsole 202 may vary depending upon the desired cushioning characteristics or upon the length and width of midsole 202. In one embodiment, as shown for example in FIG. 1, midsole 202 may include ten gaps 210. In one embodiment, midsole 202 may include in the range of two to fifteen gaps. In another embodiment, midsole 202 may include in the range of five to thirteen gaps. In another embodiment, midsole 202 may include in the range of eight to twelve gaps. In one embodiment, midsole 202 may include at least five gaps. In another embodiment, midsole 202 may include at least eight gaps. In another embodiment, midsole 202 may include at least ten gaps. The number of gaps 210 and 212 may vary depending upon a thickness of walls 208, a frequency of the undulation, and/or the angle between adjacent walls 208.

One or more troughs 206 of midsole 202 may have an outsole piece 213 attached thereto to provide additional traction. Outsole piece 213 may be rubber or any suitable material typically utilized for an outsole. In one embodiment, as shown for example in FIGS. 2 and 35, a trough 206 may have one or more outsole pieces 213. In another embodiment, as shown for example in FIG. 4, outsole piece 213 may contact one or more troughs 206 and span a portion of gap 212 between adjacent troughs 206. In another embodiment, as shown for example in FIG. 7, midsole 202 may have an outsole piece 213 that covers a periphery of a heel region of midsole 202 and/or another outsole piece 213 that covers a periphery of a forefoot region of midsole 202. Outsole piece 213 spans gaps 212 between adjacent troughs 206 and may include areas of reduced thickness 217 that allow outsole piece 213 to flex and lengthen when gaps 212 lengthen. Outsole pieces 213 may be made from a suitable polymeric material that permits the above-described lengthening and flexing. The above embodiments are merely exemplary and one skilled in the art would readily appreciate the pattern of outsole piece(s) 213 on trough(s) 206 of midsole 202 may have a variety of configurations. In addition, as shown in FIGS. 2, 4, 7, and 9, a bottom surface 215 of each trough 206 may have a contour that varies across a width of midsole 202. Bottom surface 215 of each trough 206 may have the same contour and/or shape, varying contours and/or shapes and combinations thereof. One skilled in the art would readily appreciate that the shape and pattern of outsole piece(s) 213 may correspond to the contour or shape of bottom surfaces 215 of troughs 296.

Figure 2:
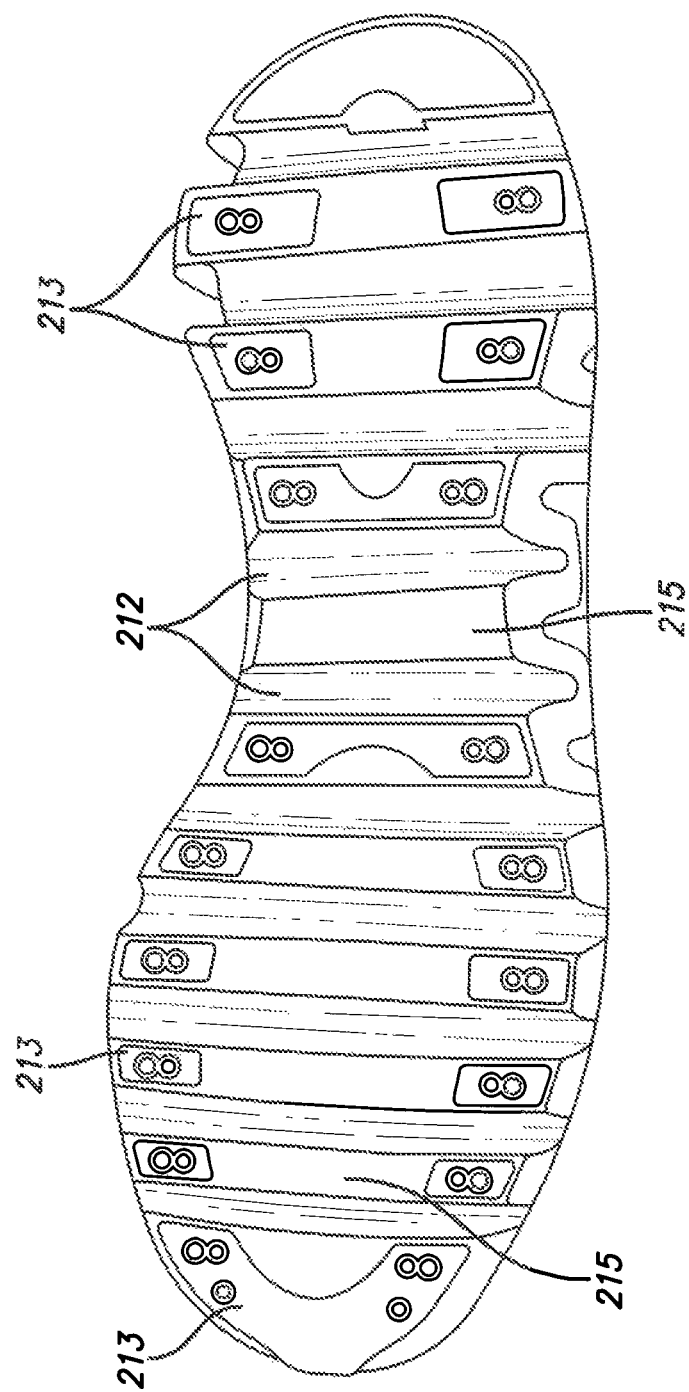
FIG. 2 is bottom view of the exemplary article of footwear of FIG. 1 according to an embodiment of the present invention.
Figure 4:
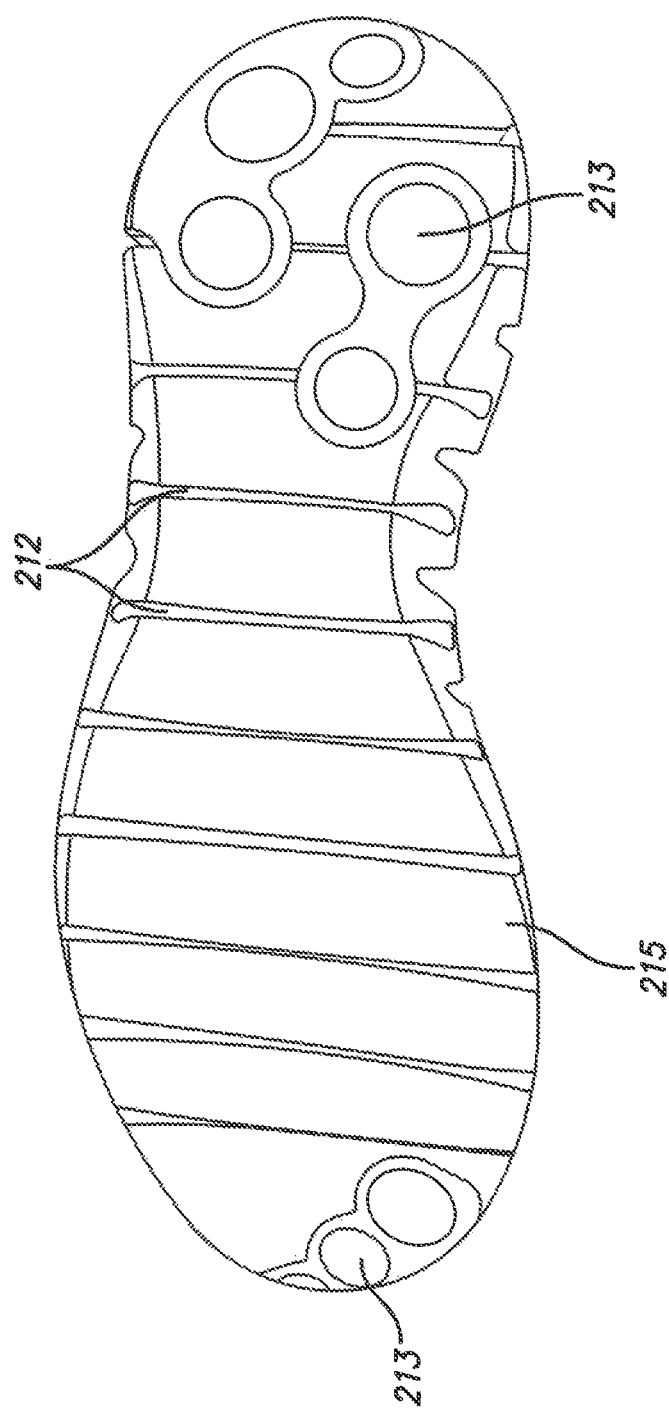
FIG. 4 is a bottom view of the exemplary article of footwear of FIG. 3 according to an embodiment of the present invention.

Midsole 202 may be a single piece, as shown for example in FIGS. 2 and 4, or may comprise two or more pieces. In one embodiment, as shown for example in FIG. 9, midsole 202 may have a lateral midsole piece 214 extending along a lateral side of article of footwear 100 and a medial midsole piece 216 extending along a medial side of article of footwear 100 with a space 218 located between lateral midsole piece 214 and medial midsole piece 216. A forefoot outsole piece 220 may be attached to both lateral midsole piece 214 and medial midsole piece 216 in a manner such that forefoot outsole piece 220 spans and covers a portion of space 218 at the forefoot of article of footwear 100. Similarly, a heel outsole piece 222 may be attached to both lateral midsole piece 214 and medial midsole piece 216 in a manner such that heel outsole piece 222 spans and covers a portion of space 218 at the heel of article of footwear 100. Lateral midsole piece 214 and medial midsole piece 216 may have corresponding undulations such that peaks 204 and troughs 206 of each piece are aligned when assembled in article of footwear 100. Having a separate lateral midsole piece 214 and medial midsole piece 216 may have the advantage of providing a ride or cushioning different from a single piece midsole 202.

As best seen in FIG. 10, midsole 202 may be shaped so that peaks 204 have a greater height at first and second sides 224, 226 of midsole 202 than in an area between first and second sides 224, 226. For example, a top surface 228 of each peak 204 is substantially concave, thereby providing a recess for receiving foot plate 300. In one embodiment, top surface 228 of some peaks 204 may have a groove 230 adjacent first and/or second sides 224, 226 that aids in aligning foot plate 300 in the recess and holding foot plate 300 in place. In one embodiment, the portion of the midsole between the first and second sides 224, 226 does not undulate and only first (e.g., lateral) side 224 and/or second (e.g., medial) side 226 undulate. Portions of gaps 210 and/or 212 between first and second sides 224 and 226 may be filled in.

Foot plate 300, as best seen in FIGS. 11 and 12, may have a bottom surface 302 with a plurality of ridges 304 extending outward from bottom surface 302. Ridges 304 may be shaped to provide outlines that correspond to the size, shape, and contour of top surfaces 228 of peaks 204 of midsole 202. Ridges 304 may also extend to side surfaces 306 of foot plate 300. Accordingly, ridges 304 aid in aligning foot plate 300 on top surfaces 228 of peaks 204 of midsole 202.

Foot plate 300 may be any suitable thermoplastic material or composite material and, in some embodiments, may be manufactured through molding or lay-up. In other embodiments, foot plate 300 may be a molded foam, such as a compression molded foam, TPU, or Pebax®. In one embodiment, foot plate 300 may be formed separately from midsole 202 and then attached and joined to midsole 202 through adhesive bonding, welding, or other suitable techniques as would be apparent to one of ordinary skill in the art. Areas 308 of bottom surface 302 that contact top surfaces 228 of peaks 204 may be textured to facilitate attachment of foot plate 300 to midsole 202. In another embodiment, foot plate 300 and midsole 202 may be co-molded and thereby formed together simultaneously.

Midsole 202 may be used in conjunction with a variety of uppers 400. In one embodiment, upper 400 may have, a bootie 402 for receiving the foot of a wearer attached to an upper surface (not shown) of foot plate 300. In some embodiments, plate 300 may be placed inside shoe 100 and midsole 202 may be attached directly to upper 400. Bootie 402 may be any suitable material that is lightweight and breathable known to those of ordinary skill in the art for use as an upper. Bootie 402 may be attached to the foot plate through adhesive or other conventional attachment techniques. Upper 400 may also have one or more structural members 404 extending from foot plate 300. Structural members 404 provide structure to bootie 402 and may extend along the lateral and medial, sides and be utilized in lacing article of footwear 100. Structural members 404 may also be present at a heel area to provide an internal or external heel counter or at a forefoot area to provide an internal or external toe cap. Structural members 404 may be molded from suitable polymeric materials known to those of ordinary skill in the art. Structural members 404 may also have a variety of shapes and sizes as would be apparent to one of ordinary skill in the art.

With reference to FIGS. 13 and 31-33, manufacturing of midsole 202 according to embodiments of the present invention will now be described. As will be apparent to those of ordinary skill in the art, midsole 202 may be molded by injection molding using one or more molds 600. The mold 600 may include molds for one or more midsoles 202. With reference to FIGS. 13 and 31, mold 600 may include a plurality of ridges 601 which correspond to the one or more gaps 212 of midsole 202. During molding one or more injection sites or sprue passages 602 may be used to introduce midsole material into the mold. As shown in FIGS. 13 and 31, in one embodiment of the present invention, eleven (11) sprues may be used to introduce material into the mold, thereby resulting in posts 232, which will be subsequently removed, extending from midsole 202 in the areas corresponding to the sprues. In this manner, the material may be distributed evenly throughout the midsole. In the heel portion of midsole 202, one sprue may be used in the area of the rearmost peak, and two sprues may be used at each of the next two peaks in the heel region. Two sprues may also be used at each of the fifth, seventh, and ninth peaks in midsole 202. In another embodiment, one or more sprues may be used at each of the peaks to introduce the midsole material to the mold. The use of sprues for introducing midsole material into the mold may be useful because sprues may provide for even flow of material; may help to provide proper curing of material; may help to provide even temperature distribution after filling which, in turn, may contribute to consistent skin thickness; may help to make midsoles that are consistent left to right; and may help to make sure the mold is fully filled. Other arrangements for introducing material into the molds during manufacture of midsole 202 may be used. In some embodiments, other methods of molding may be utilized including, but not limited to, compression molding, injection molding, and expansion molding, whereby pellets are placed in a mold and expanded.

During manufacture, because midsole 202 may expand upon removal from its mold, the mold may comprise a smaller size than the desired size of the midsole. For example, in one embodiment of the present invention using EVA material, the mold may comprise about 65% to about 75% of the size of the finished midsole. Depending on the expansion ratio of the material used, other mold sizes may be used.

With reference to FIGS. 32 and 33, in one embodiment, one or more post-molding forms 610 may be used after midsole 202 is removed from mold 600 during manufacturing. After removal from mold 600, top surface of midsole 202 may be placed on top of post-molding form 610. Post-molding form 610 may include a plurality of ridges 611 formed on a base 612 which correspond to the one or more gaps 210 of midsole 202. In alternative embodiments, bottom surface of midsole 202 may be placed on top of post-molding form 610, and ridges 611 may correspond to one or more gaps 212 of midsole 202. Post-molding form 610 may facilitate proper cooling and shaping of midsole 202. For example, midsole 202 may contract as it cools and/or finishes curing. Because the form is dimensionally stable, post-molding form 610 may limit and/or direct the contraction of the midsole 202 such that the midsole results in the desired shape. In some but not necessarily all embodiments, portions of midsole 202 may have varying thicknesses and/or may cool at different rates. As a result, midsole 202 may curl or otherwise become misshapen without use of post-molding form 610. In one embodiment, one or more weights 620 may be placed on midsole 202 as it cools to further facilitate proper cooling and shaping. In one embodiment, a weight 620 may be placed on midsole 202 in the heel area and in the forefoot area of the midsole. Post-molding form 610 may comprise plastic, ceramic, metal, wood, bamboo; cast epoxy, or other suitable material.

Midsole 202 may be molded to tailor to various needs such as, for example, to prevent pronation or supination. In such instances, certain areas of midsole 202 may be imparted with different characteristics in order to achieve such customizations. In instances where a medial side of midsole 202 needs to be customized and not a lateral side or vice versa, it may be preferred to utilize a midsole 202 with lateral midsole piece 214 and medial midsole piece 216, as described above. As an alternative to, or in addition to, modifying midsole 202, inserts may be placed between midsole 202 and plate 300, as discussed in more detail below, or posts may be utilized to connect midsole 202 to upper 400.

The embodiments of FIGS. 1-4 and 6-10, have illustrated midsole 202 as undulating with peaks 204 and troughs 206 from toe to heel, however this is merely exemplary. In some embodiments, as shown for example in FIGS. 14 and 15, midsole 202 may undulate with peaks 204 and troughs 206 only in a forefoot region. In other embodiments, as shown for example in FIGS. 16-18, midsole 202 may undulate with peaks 204 and troughs 206 only in a heel region. In other embodiments, as shown for example in FIG. 19, midsole 202 may also have one or more rows 334 that undulate with peaks 204 and troughs 206 in a medial to lateral direction. In some embodiments, peaks 204 and troughs 206 of each row 334 may be aligned.

In certain embodiments, undulating sole 200 may be manufactured to provide a different and unique ride and/or feel to article of footwear 100, while also providing a unique aesthetic appeal and improved cushioning and support.

With reference to FIGS. 20-22, embodiments of the present invention may include one or more inserts 500 to provide the desired stiffness and/or cushioning properties of midsole 202. For example, one or more inserts 500 may be included to make all or a portion of midsole 202 more stiff. In this manner, for example, insert 500 may help in limiting pronation or supination of the foot of the wearer.

In one embodiment, insert 500 may include one or more support elements 510 connected by connecting members 520. In one embodiment, support element 510 includes a support surface 511 that is curved such that the support element 510 is substantially u-shaped, as shown, for example, in FIG. 22. As shown in FIG. 20, in one embodiment support element 510 may include a proximate end 512 and a distal end 514. The proximate end 512 may be rounded and the height of support element 510 may gradually decrease from proximate end 512 to distal end 514.

Each support element 510 may be connected to an adjacent support element 510 by a connecting member 520. In one embodiment, connecting member 520 extends from the distal end 514 of one support element 510 to the distal end 514 of an adjacent support element 510. In alternative embodiments, connecting member 520 may extend from the distal end 514 of a first support element 510 to the proximate end 512 of an adjacent support element. In other embodiments, the connecting member 520 may extend from any point along the length of a first support element 510 to any point along the length of an adjacent support element 510. Connecting member 520 may connect support elements that are not adjacent. In one embodiment, support elements 510 disposed at an end of the insert 500 may include a connecting member 522 that does not connect to an adjacent support element. For example, forefoot end support element 516 and rearfoot end support element 518, as shown in FIG. 20, may include a connecting member 522 that is not connected at one end. Alternatively, insert 500 may not include connecting members 522 extending from end support elements. In one embodiment, as shown, for example in FIGS. 20-22, insert 500 may include five (5) connected support elements 510. As will be discussed in detail below, other combinations of support elements 510 and connecting members 520 for an insert 500 may be used to provide the desired stiffness and/or cushioning of midsole 202.

With reference to FIGS. 23 and 24, in one embodiment, insert 500 may be disposed between midsole 202 and plate 300 and may be coupled to midsole 202. In particular, in one embodiment, each support element 510 of insert 500 may be disposed within a gap 210 of midsole 202. For example, as shown in FIG. 23, in an embodiment of an insert 500 having five (5) support elements 510, each of the support elements 510 may be disposed in a gap 210. The support surface 511 of support element 510 is preferably contoured to fit snugly within gap 210 along an interior surface 211 of the gap 210. The support surface 211 may cover all or a portion of the interior surface 211 of the gap 210 where the support element 510 is located. For example, in one embodiment support surface 511 may extend from the bottom 207 of gap 210 partially (e.g., half way) up interior wall 209 or to the top of interior wall 209. In one embodiment, support element 510 may not extend completely into gap 210 such that it does not contact the bottom 207 of gap 210. The support surface 511 may cover only a portion of interior wall 209 between bottom 207 and the top of interior wall 209.

In one embodiment, support surface 511 is curved such that the support element 510 is substantially u-shaped. In other embodiments, support surface 511 may be square, v-shaped, omega-shaped, or otherwise shaped to fit within gap 210 or other portion of midsole 202. In one embodiment, support element 510 may be secured within gap 210 by adhesive. In other embodiments, adhesive may not be used and the snug fit of the element within the gap may keep it in place.

In one embodiment, as shown in FIG. 23, insert 500 may be generally disposed in the arch region of midsole 202. In other embodiments, insert 500 may be disposed in the forefoot region, the heel region, and/or along the entire length of midsole 202. Generally, insert 500 may be positioned to provide the desired stiffness and/or cushioning of midsole 202.

The size of support element 510 also may be adapted such that support element 510 fits within gap 210. In embodiments of the present invention in which the depth of gaps 210 vary along midsole 202, the size of support elements 510 may likewise vary along insert 500. For example, as discussed above, gaps 210 may be deeper in the heel region of midsole 202, and become more shallow toward the forefoot region of midsole 202. Correspondingly, support elements 510 may be larger in the rearward portion of insert 500 and become smaller toward the forward portion of insert 500. For example, forefoot end support element 516 may be smaller than rearfoot end support element 518.

Insert 500 may be made of a rigid or flexible material to provide the desired stiffness properties of the midsole 202. In one embodiment, the insert 500 comprises TPU. Other suitable materials, including but not limited to, elastomers, thermoplastic elastomers (TPE), foam-like plastics (e.g., Pebax® foam and/or Hytrel® foam), gel-like plastics, foam, metal, or other suitable materials and combinations thereof.

In one embodiment, insert 500 may be injection molded as a unitary piece. In other embodiments, support elements 510 may be molded separately and then attached. In some embodiments, one support element 510 may be made of a different material than another support element 510. For example, a first support element 510 may be made of a stiffer material than a second support element 510 to provide the desired stiffness or cushioning properties to different areas of midsole 202. In one embodiment, insert 500 may be co-molded with midsole 202. For example, insert 500 may be molded and midsole 202 may be molded under insert 500, or insert 500 may be molded directly on midsole 202. In one embodiment, as shown for example in FIG. 35, support elements 510 may be formed as part of midsole 202 to form a unitary and monolithic structure. Support elements 510 may be formed in gaps 212, as shown, and/or in gaps 210. In one embodiment, two support elements 510 may be formed in the rearmost gap 212 and one support element may be formed in the next gap 212. It will be appreciated that support elements 510 may be formed in other gaps in various combinations. In one embodiment, midsole 202 may be molded around insert 500 such that insert 500 is embedded in the midsole. In one embodiment, insert 500 may be integral with plate 300. The plate 300 may extend partially or completely into support element 510.

In one embodiment, one or more support elements 510 of insert 500 may extend across a portion of the width of the midsole 202 to provide desired stiffness properties to a portion of midsole 202. For example, as shown in FIG. 23, support elements 510 may extend inwardly from the medial side of the midsole 202 across a portion of the width of midsole 202. During use, support element 510 may provide support to midsole 202 in this area and may limit compression of the midsole. For example, when midsole 202 is under load, support element 510 may limit compression of the walls 208 around the area of the support element. As a result, insert 500 may impart additional stiffness to the medial side of midsole 202 and may limit, for example, supination of the foot.

In other embodiments, the support elements may extend inwardly from the lateral side of the midsole 202 across a portion of the midsole. In this manner, insert 500 may impart additional stiffness to the lateral side of midsole 202 and may, for example, limit pronation of the foot. In still other embodiments, the insert 500 may extend substantially across the entire width of the midsole 202 such that it may impart desired stiffness or cushioning characteristics across the width of the midsole. In some embodiments, insert 500 may include one or more support elements 510 that extend only across a portion of the width of midsole 202 and one or more support elements 510 that extend across the entire width of midsole 202.

In one embodiment, connecting member 520 may be substantially flat such that it does not interfere with placement of plate 300 on midsole 202. A groove may be formed in the top of midsole 202 to receive connecting member 520 such that connecting member 520 is flush with the top of midsole 202. As shown in FIG. 23, connecting members 520 of insert 500 may collectively form a generally curved shape from the perimeter of midsole 202 through an interior portion of the midsole 202. In one embodiment, connecting members 520 may be positioned to provide additional support to the insert 500.

In one embodiment, as shown in FIG. 24, all or a portion of the insert 500 may be visible from the side of footwear 100. For example, proximate end 512 of one or more support elements 510 may be visible through gaps 210. In other embodiments, insert 500 may not be visible.

Any number of support elements 510 and connecting members 520 for an insert 500 may be used to provide the desired stiffness or cushioning properties of midsole 202. As shown in FIG. 25, in one embodiment insert 500 may include two (2) support elements 510. The support elements 510 may be sized for use in the heel portion of midsole 202. In one embodiment, as shown in FIG. 26, insert 500 may include two (2) support elements 510 generally sized for use in the forefoot portion of the midsole 202. In one embodiment, as shown in FIG. 27, insert 500 may include one support element. In yet other embodiments, insert 500 may comprise a single support element 510 without connecting members 520. As shown in FIGS. 28-29, in one embodiment insert 500 may include four (4) support elements 510 that extend substantially across the width of the midsole 202. Connecting members 520 may connect adjacent support elements 520 at the middle of the support element. In one embodiment, the number of support elements 510 may be the same as the number of gaps 210 in midsole 202.

In an alternative embodiment, insert 500 may be disposed on the underside of midsole 202. Each support element 510 of insert 500 may be disposed within gap 212 of midsole 202. The support elements 510 may be sized and shaped accordingly. In other embodiments, insert 500 may include one or more support elements 510 adapted to fit snugly on peak 204.

In a preferred embodiment, insert 500 may be permanently disposed in midsole 202 during manufacture of footwear 100. In other embodiments, insert 500 may be readily removable from midsole 202. For example, in one embodiment, a support element 510 may be inserted into gap 210 between midsole 202 and plate 300 from the side of footwear 100. The support element 510 may include a tab that may be pulled to subsequently remove the support element 510 from gap 210. In this manner, inserts 500 or support elements 510 may be sold "after-market", and a user may continually customize the stiffness or cushioning properties of footwear 100 depending on desired uses, aging of the shoe, or other conditions of use.

In one embodiment, one or more support elements 510 may be solid elements. For example, as shown in FIG. 30, a support element 510 may be completely solid, as shown by support element 513, or may be partially solid, as shown by support elements 515 and 517. The solid support elements may be filled with the same material as the support surface 511 and formed as a unitary piece, or may be filled with a different material, such as, for example, foam or other suitable material. In one embodiment, support element 510 may be filled with a portion of plate 300. The solid support elements may be adapted to provide additional support to midsole 202. In other embodiments, support element 510 may be hollow, fluid filled, or filled with pressurized or ambient air.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A sole for an article of footwear, comprising:
an undulating foam midsole having a heel portion, a forefoot portion, a medial sidewall and a lateral sidewall,
wherein the midsole is sinusoidal along at least a portion of a length of the midsole such that a plurality of spaced apart peaks extend across an entire width of the midsole from the medial sidewall to the lateral sidewall and a plurality of spaced apart troughs extend across the entire width of the midsole from the medial sidewall to the lateral sidewall,
wherein more than one peak of the plurality of peaks have a greater height at the medial and lateral sidewalls of the midsole than in an area between the medial and lateral sidewalls,
wherein more than one peak of the plurality of peaks have a gap devoid of material disposed directly below each of the peaks, wherein the gaps each extend across the entire width of the midsole,
wherein at least one trough of the plurality of troughs has a gap devoid of material disposed directly above the at least one trough, wherein the at least one gap extends across the entire width of the midsole,
wherein at least a portion of an outer face of a trough of the plurality of troughs along at least one of the medial sidewall and the lateral sidewall is nonplanar to an apex of a directly adjacent peak of the plurality of peaks, and wherein the midsole extends across an entire width of the sole; and a plate disposed on the midsole, wherein at least one apex of a peak of the plurality of peaks extends above a bottom surface of the plate and contacts both a medial side surface and a lateral side surface of the plate.

2. The sole of claim 1, wherein the lateral sidewall is sinusoidal.

3. The sole of claim 1, wherein the midsole is sinusoidal along the entire length of the midsole.

4. The sole of claim 1, wherein the midsole is sinusoidal along the length of the heel portion of the midsole.

5. The sole of claim 1, wherein the plurality of peaks of the lateral sidewall have rounded top surfaces.

6. The sole of claim 1, wherein the plurality of peaks of the lateral sidewall have flat top surfaces.

7. The sole of claim 1, wherein the plurality of peaks of the lateral sidewall have pointed top surfaces.

8. The sole of claim 1, wherein the midsole includes a top surface shaped to receive an upper of an article of footwear, and wherein the plurality of peaks of the lateral sidewall have rounded top surfaces.

9. The sole of claim 1, further comprising an outsole coupled to the midsole.

10. The sole of claim 1, wherein the portion of the outer face of a trough of the plurality of troughs comprises a first plane and a second plane angled with respect to the first plane, and wherein the outer face transitions from the first plane to the second plane in an area between a bottom surface of the midsole and a top surface of the midsole.

11. A sole for an article of footwear, comprising:

an undulating foam midsole having a top surface, a bottom surface, a medial sidewall, and a lateral sidewall, wherein the midsole extends across an entire width of the sole between the medial sidewall and the lateral sidewall, wherein the midsole undulates to define a plurality of spaced apart gaps in the top surface extending entirely across the midsole from the medial sidewall to the lateral sidewall, wherein a plurality of spaced apart gaps in the bottom surface extend entirely across the midsole from the medial sidewall to the lateral sidewall, wherein a plurality of peaks disposed directly above respective ones of the gaps in the bottom surface have a greater height at the medial and lateral sidewalls of the midsole than in an area between the medial and lateral sidewalls, and wherein at least a portion of an outer face of a trough along at least one of the medial sidewall and the lateral sidewall is nonplanar to an apex of a directly adjacent peak of the plurality of peaks; and a plate disposed on a portion of the top surface of the midsole, wherein at least one apex of a peak of the plurality of peaks extends above a bottom surface of the plate and contacts both a medial side surface and a lateral side surface of the plate.

12. The sole of claim 11, wherein each of a plurality of top surface gaps is disposed between directly adjacent bottom surface gaps.

13. The sole of claim 11, wherein the top surface gaps are evenly spaced apart.

14. The sole of claim 11, wherein the bottom surface gaps are evenly spaced apart.

15. The sole of claim 11, wherein each peak of the lateral sidewall is disposed between directly adjacent top surface gaps.

16. The sole of claim 15, wherein the peaks of the lateral sidewall have rounded top surfaces.

17. The sole of claim 15, wherein the peaks of the lateral sidewall have flat top surfaces.

18. The sole of claim 15, wherein the peaks of the lateral sidewall have pointed top surfaces.

19. The sole of claim 11, wherein the midsole extends along an entire length of the sole.

20. The sole of claim 11, further comprising an outsole coupled to the midsole.

21. The sole of claim 11, wherein the portion of the outer face of a trough of the plurality of troughs comprises a first plane and a second plane angled with respect to the first plane, and wherein the outer face transitions from the first plane to the second plane in an area between the bottom surface of the midsole and the top surface of the midsole.

22. An article of footwear, comprising:

an upper;

an undulating foam midsole disposed below the upper such that a gap is disposed between the midsole and the upper, the midsole having a heel portion, a forefoot portion, a medial sidewall and a lateral sidewall, wherein the midsole is sinusoidal along a length of the midsole such that there are a plurality of spaced apart peaks and a plurality of spaced apart troughs extending across an entire width of the midsole, wherein more than one peak of the plurality of peaks have a greater height at the medial and lateral sidewalls of the midsole than in an area between the medial and lateral sidewalls, wherein more than one peak of the plurality of peaks have a gap devoid of material disposed directly below the peak, wherein the gaps each extend across the entire width of the midsole, wherein at least one trough of the plurality of troughs has a gap devoid of material disposed directly above the at least one trough, wherein the at least one gap extends across the entire width of the midsole, wherein at least a portion of an outer face of a trough of the plurality of troughs along at least one of the medial sidewall and the lateral sidewall is nonplanar to an apex of a directly adjacent peak of the plurality of peaks, and wherein the midsole extends across an entire width of the article of footwear between the medial sidewall and the lateral sidewall; and a plate disposed intermediate to the upper and the midsole, wherein at least one apex of a peak of the plurality of peaks extends above a bottom surface of the plate and contacts both a medial side surface and a lateral side surface of the plate.

23. The article of footwear of claim 22, wherein more than one gap of the plurality of gaps are disposed between the midsole and the upper.

24. The article of footwear of claim 22, wherein at least a portion of a gap of the plurality of gaps is disposed intermediate to the midsole and the plate.

25. The article of footwear of claim 22, wherein the peaks of the lateral sidewall have rounded top surfaces.

26. The article of footwear of claim 22,
wherein the peaks of the lateral sidewall have flat top surfaces.

27. The article of footwear of claim 22,
wherein the peaks of the lateral sidewall have pointed top surfaces.

28. The article of footwear of claim 22, wherein the portion of the outer face of a trough of the plurality of troughs comprises a first plane and a second plane angled with respect to the first plane, and wherein the outer face transitions from the first plane to the second plane in an area between a bottom surface of the midsole and a top surface of the midsole.

29. An article of footwear, comprising:
an upper;
an undulating foam midsole having a top side and a bottom side, the midsole extending across an entire width of the article of footwear, the midsole comprising:
a plurality of spaced apart peaks defining a plurality of gaps in the top side of the midsole extending across the entire width of the article of footwear between a medial sidewall of the midsole and a lateral sidewall of the midsole; and
a plurality of spaced apart troughs defining a plurality of gaps in the bottom side of the midsole extending across the entire width of the article of footwear between the medial sidewall of the midsole and the lateral sidewall of the midsole; and
a plate disposed intermediate to the upper and the midsole, the plate comprising:
a bottom surface;
a medial side surface; and
a lateral side surface,
wherein at least one peak of the plurality of peaks extends above the bottom surface of the plate and contacts both the lateral side surface and medial side surface of the plate, wherein more than one peak of the plurality of peaks have a greater height at the medial and lateral sidewalls of the midsole than in an area between the medial and lateral sidewalls of the midsole.

30. The article of footwear of claim 29, further comprising:
a plurality of ridges disposed along the lateral side surface, the bottom surface, and the medial side surface of the plate, and
wherein the ridges are configured to respectively receive top surfaces of respective ones of the plurality of peaks.

31. The article of footwear of claim 29, wherein the plate is disposed on the top side of the midsole.

* * * * *